(12) United States Patent
Bloom et al.

(10) Patent No.: US 12,703,543 B2
(45) Date of Patent: Aug. 11, 2026

(54) RETAINABLE CLOSURE

(71) Applicant: Berry Global, Inc., Evansville, IN (US)

(72) Inventors: Daniel A. Bloom, Bowling Green, OH (US); Kenneth S. Bloom, Bloomdale, OH (US); Andrew KreinBrink, Toledo, OH (US)

(73) Assignee: Berry Global, Inc., Evansville, IN (US)

( * ) Notice: Subject to any disclaimer, the term of this patent is extended or adjusted under 35 U.S.C. 154(b) by 0 days.

(21) Appl. No.: 18/543,490

(22) Filed: Dec. 18, 2023

(65) Prior Publication Data

US 2024/0199285 A1 Jun. 20, 2024

Related U.S. Application Data

(60) Provisional application No. 63/433,214, filed on Dec. 16, 2022.

(51) Int. Cl.

| | |
|---|---|
| ***B65D 41/34*** | (2006.01) |
| ***B29C 45/00*** | (2006.01) |
| ***B29D 99/00*** | (2010.01) |
| ***B29K 23/00*** | (2006.01) |
| ***B29L 31/56*** | (2006.01) |
| ***B65D 55/16*** | (2006.01) |

(52) U.S. Cl.
CPC ...... *B65D 41/3428* (2013.01); *B29C 45/0081* (2013.01); *B29D 99/0096* (2013.01); *B65D 55/16* (2013.01); *B29C 2793/0027* (2013.01); *B29K 2023/065* (2013.01); *B29K 2023/12* (2013.01); *B29L 2031/565* (2013.01); *B65D 2401/30* (2020.05)

(58) Field of Classification Search
CPC ............... B65D 41/3428; B65D 55/16; B65D 2401/30; B29D 99/0096; B29C 45/0081; B29C 2793/0027; B29K 2023/065; B29K 2023/12; B29L 2031/565
USPC .......................................................... 220/290
See application file for complete search history.

(56) References Cited

U.S. PATENT DOCUMENTS

| | | | |
|---|---|---|---|
| 3,904,062 | A | 9/1975 | Grussen |
| 4,394,918 | A | 7/1983 | Grussen |
| 5,984,123 | A | 11/1999 | Mogami et al. |
| 6,474,491 | B1 | 11/2002 | Benoit-Gonin et al. |
| 8,469,213 | B2 | 6/2013 | Ishii et al. |
| 8,794,460 | B2 | 8/2014 | Druitt et al. |
| 9,010,555 | B2 | 4/2015 | Luzzato et al. |
| 9,108,774 | B2 | 8/2015 | Kwon |
| 10,625,914 | B2 | 4/2020 | Wang et al. |
| 10,654,324 | B2 | 5/2020 | Fredenburg |
| 10,654,625 | B2 | 5/2020 | Migas et al. |

(Continued)

FOREIGN PATENT DOCUMENTS

| | | | |
|---|---|---|---|
| AU | 2019204356 | B1 | 7/2020 |
| EP | 2308772 | A1 | 4/2011 |

(Continued)

OTHER PUBLICATIONS

International Search Report and Written Opinion of corresponding international application No. PCT/US2023/084569 mailed May 17, 2024.

*Primary Examiner* — Nathan J Jenness
*Assistant Examiner* — Eric C Baldrighi
(74) *Attorney, Agent, or Firm* — Barnes & Thornburg LLP

(57) ABSTRACT

A retainable closure with tamper evident features is disclosed.

20 Claims, 14 Drawing Sheets

(56) References Cited

U.S. PATENT DOCUMENTS

| | | | | |
|---|---|---|---|---|
| 10,836,544 | B2 | 11/2020 | Kim | |
| 10,836,549 | B2 | 11/2020 | Maguire | |
| D968,218 | S | 11/2022 | Sorbara et al. | |
| 11,505,372 | B2 | 11/2022 | Bloom et al. | |
| 2010/0308050 | A1* | 12/2010 | Gassner | B65D 41/3447 220/266 |
| 2011/0114593 | A1 | 5/2011 | Ishii et al. | |
| 2011/0174760 | A1 | 7/2011 | Luzzato et al. | |
| 2012/0024815 | A1 | 2/2012 | Kwon | |
| 2012/0285921 | A1 | 11/2012 | Kwon | |
| 2018/0079570 | A1 | 3/2018 | Maguire | |
| 2019/0344944 | A1 | 11/2019 | Maguire | |
| 2019/0375555 | A1 | 12/2019 | Edie et al. | |
| 2020/0017260 | A1 | 1/2020 | Migas et al. | |
| 2020/0207525 | A1 | 7/2020 | Sung | |
| 2020/0369446 | A1 | 11/2020 | Mélan-Moutet | |
| 2021/0094733 | A1 | 4/2021 | Bloom et al. | |
| 2022/0073238 | A1* | 3/2022 | Naumann | B65D 41/3428 |
| 2022/0267065 | A1 | 8/2022 | Lohrman et al. | |
| 2022/0289435 | A1 | 9/2022 | Lohrman et al. | |
| 2022/0315302 | A1 | 10/2022 | Minnette et al. | |
| 2022/0355988 | A1* | 11/2022 | Falzoni | B65D 41/3428 |
| 2022/0363447 | A1 | 11/2022 | Sorbara et al. | |
| 2022/0371785 | A1 | 11/2022 | Lohrman | |
| 2022/0371795 | A1* | 11/2022 | Naumann | B65D 41/3423 |
| 2023/0041911 | A1 | 2/2023 | Bloom et al. | |

FOREIGN PATENT DOCUMENTS

| | | | | |
|---|---|---|---|---|
| EP | 3277598 | A1 | 2/2018 | |
| EP | 4053035 | A1 | 9/2022 | |
| EP | 4061731 | A1 | 9/2022 | |
| EP | 4061736 | A1 | 9/2022 | |
| EP | 3877281 | B1 | 11/2022 | |
| EP | 4089030 | A1 | 11/2022 | |
| ES | 2826223 | A1 | 5/2021 | |
| JP | 2012-201380 | A | 10/2012 | |
| JP | 5341729 | B2 | 8/2013 | |
| JP | 2014031202 | A * | 2/2014 | B65D 41/3428 |
| JP | 5866249 | B2 | 1/2016 | |
| KR | 10-2009-0005746 | A1 | 1/2009 | |
| KR | 10-0981240 | B1 | 9/2010 | |
| WO | 2002062674 | A1 | 8/2002 | |
| WO | 2016182305 | A1 | 11/2016 | |
| WO | 2019177616 | A1 | 9/2019 | |
| WO | 2019238988 | A1 | 12/2019 | |
| WO | 2020037010 | A1 | 2/2020 | |
| WO | 2020050823 | A1 | 3/2020 | |
| WO | 2020093058 | A2 | 5/2020 | |
| WO | 2020099516 | A1 | 5/2020 | |
| WO | WO-2020099200 | A1 * | 5/2020 | B65D 5/748 |
| WO | 2020093058 | A3 | 7/2020 | |
| WO | 2020144182 | A1 | 7/2020 | |
| WO | 2020156847 | A1 | 8/2020 | |
| WO | 2020157695 | A1 | 8/2020 | |
| WO | 2020178012 | A1 | 9/2020 | |
| WO | 2020182852 | A1 | 9/2020 | |
| WO | 2020182854 | A1 | 9/2020 | |
| WO | 2020193821 | A1 | 10/2020 | |
| WO | 2020201227 | A1 | 10/2020 | |
| WO | 2020212426 | A1 | 10/2020 | |
| WO | 2020227813 | A1 | 11/2020 | |
| WO | 2020229134 | A1 | 11/2020 | |
| WO | 2020240518 | A1 | 12/2020 | |
| WO | 2021067412 | A1 | 4/2021 | |

* cited by examiner

RETAINABLE CLOSURE

PRIORITY CLAIM

This application claims priority under 35 U.S.C. § 119(e) to U.S. Provisional Application Ser. No. 63/433,214 filed Dec. 16, 2022, which is expressly incorporated by reference herein.

TECHNICAL FIELD

The present disclosure relates generally to a closure, and more specifically to a retainable closure for a container.

BACKGROUND

It is often desirable to store product or contents in a container or package. It is often desirable to close the container with a closure. It is also often desirable to provide a closure that will remain tethered or retained to the container after opening the closure relative to the container. A retainable closure may be provided with tamper evident features.

SUMMARY

Certain embodiments according to the present disclosure provide a closure with tamper evident features for a container. The closure may be configured such that it has tamper evident features and remains with a corresponding container after opening.

In aspect, for instance, a closure is provided that has a cover and a skirt depending from the cover. It also has a tamper band, wherein the skirt is disposed between the cover and the tamper band. A first cross separation area extends around a portion of the skirt. A first transverse separation area extends transverse to the first cross separation area to a bottom of the tamper band. A second transverse separation area extends transverse to the first cross separation area to a bottom of the tamper band. The first transverse separation area and the second transverse separation area at least partially define a tab. A first hinge is disposed between the first cross separation area and the first transverse separation area. A second hinge is disposed between the first cross separation area and the second transverse separation area. The closure is configured to rotate about a hinge axis that extends through the first hinge and the second hinge between a closed position in which the cover blocks access to the container and an open position in which the cover allows discharge of contents from the container. The tab is configured to engage the container when the closure is in the open position to retain the closure in the open position. The first hinge and second hinge allow movement of the closure between the closed position and the open position and retain the skirt to the tamper band. The tamper band includes one or more segments connected by a segment bridge, the segment bridge extending behind the tab. A tab aperture is disposed behind the tab opposite a tab outer surface, the tab aperture separating the tab from the segment bridge.

In another aspect, for instance, a closure for a container is provided having a cover and a skirt depending from the cover. A tamper band is also provided, wherein the skirt is disposed between the cover and the tamper band. A first cross separation area extends around at least half of the skirt and separating the skirt from the tamper band. A first transverse separation area extends transverse to the first cross separation area toward a bottom of the tamper band. A second transverse separation area extends transverse to the first cross separation area toward a bottom of the tamper band. The first transverse separation area and the second transverse separation area at least partially define a tab. A first hinge is disposed between the first cross separation area and the first transverse separation area. A second hinge is disposed between the first cross separation area and the second transverse separation area. The closure is configured to rotate about a hinge axis that extends through the first hinge and the second hinge between a closed position in which the cover blocks access to the container and an open position in which the cover allows discharge of contents from the container. The tab is configured to engage a container bead of the container when the closure is in the open position to retain the closure in the open position. The first hinge and second hinge allow movement of the closure between the closed position and the open position and retain the skirt to the tamper band. The tamper band includes one or more segments on a radially inward side of the tamper band, the one or more segments are connected by a segment bridge on a radially inward side of the tab, and the one or more segments cooperate with the segment bridge to form a continuous hoop of material. A tab aperture is disposed behind the tab opposite a tab outer surface, the tab aperture separating the tab from the segment bridge so the tab may invert when the closure is moved between the open position and the closed position.

In yet another aspect, for instance, a method of providing a retainable, tamper evident closure is provided. The method comprises the step of forming a closure having a cover, a skirt, and a tamper band, the skirt disposed between the cover and the tamper band. The tamper band includes one or more segments and a segment bridge connecting the one or more segments. The method includes forming a first transverse separation area and a second transverse separation area in the tamper band that extend in a first axial direction to at least partially define a tab. The method further includes forming a first cross separation area that extends transverse to the first transverse separation area and the second transverse separation area and at least partially separating the skirt and the tamper band. The method also includes forming a tab aperture that separates the tab from the segment bridge, the segment bridge provided radially inward of the tab.

BRIEF DESCRIPTION OF THE DRAWINGS

Embodiments now will be described more fully hereinafter with reference to the accompanying drawings, in which some, but not all embodiments may be shown. Indeed, embodiments may be illustrated or described in many different forms and the present disclosure should not be construed as limited to the embodiments set forth herein. Like numbers refer to like elements throughout, and wherein.

DETAILED DESCRIPTION

Embodiments now will be described more fully hereinafter with reference to the accompanying drawings, in which some, but not all embodiments may be shown. Indeed, embodiments may take many different forms and the present disclosure should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The terms "substantial" or "substantially" may encompass the whole as specified, according to certain embodiments, or largely but not the whole specified according to other embodiments.

Figure 1:
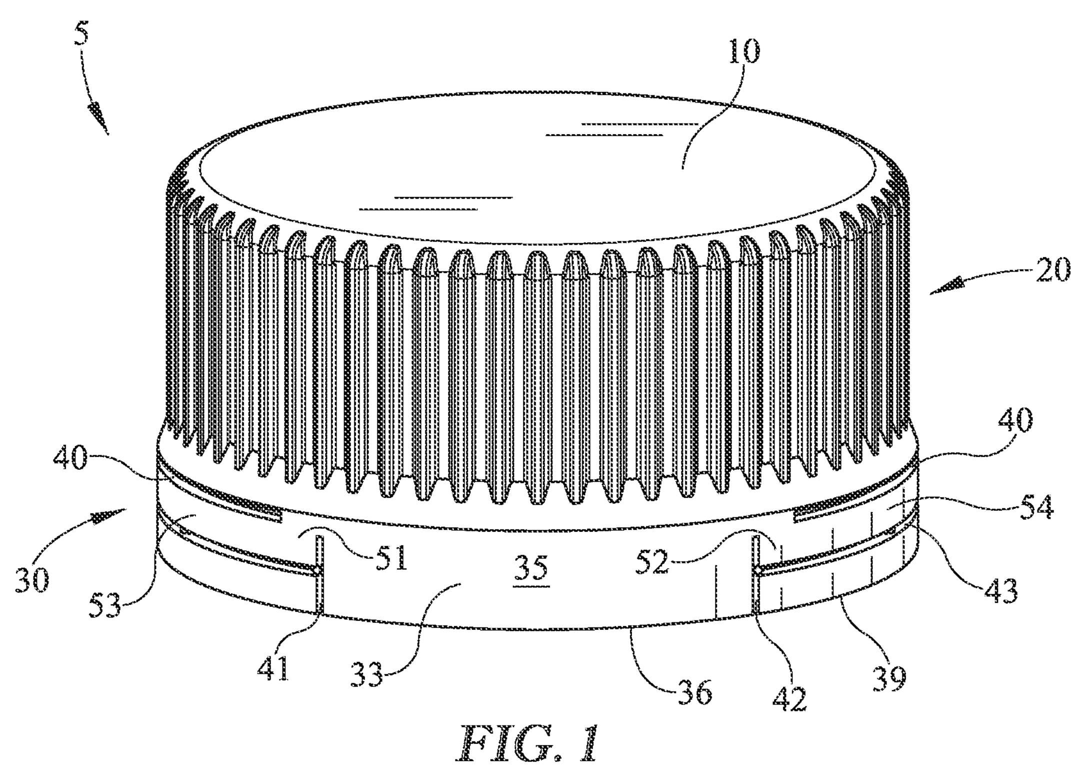
FIG. 1 illustrates a top perspective view of a first embodiment of a closure.

Some embodiments of a closure 5 may include a lid or cover 10 and/or a skirt 20, as shown for example in FIG. 1. Lid 10 may be configured to substantially block access to anything in, under, and/or covered by lid 10, such as a product storage region within a container. Skirt 20 may depend from lid 10 and may include an attachment feature such as an internal thread 21 for attachment to a container to be covered by closure 5. Lid 10 may include one or more sealing features as discussed more below, which may be, for example, of the plug fit or friction fit type, and/or a seal, gasket, liner, or the like.

Closure 5 may include a tamper band 30, as shown for example in FIGS. 1 through 4, which may be configured to at least partially separate from the rest of closure 5 when removed from an underlying bottle or container. Tamper band 30 may partially separate from skirt 20, for example, to allow closure 5 to be moved between an open position and a closed position relative to the container, while staying partially connected to skirt 20 and/or another portion of closure 5 to allow closure 5 to remain attached, coupled, and/or retained to the container via tamper band 30. Closure 5 and/or any portion thereof may be configured to be removably attachable to the container. Closure 5 and/or tamper band 30 may provide a visual indication to a user that closure 5 has been removed from the bottle or container by virtue of the separation of tamper band 30 from the rest of closure 5 and/or skirt 20.

Figure 2:
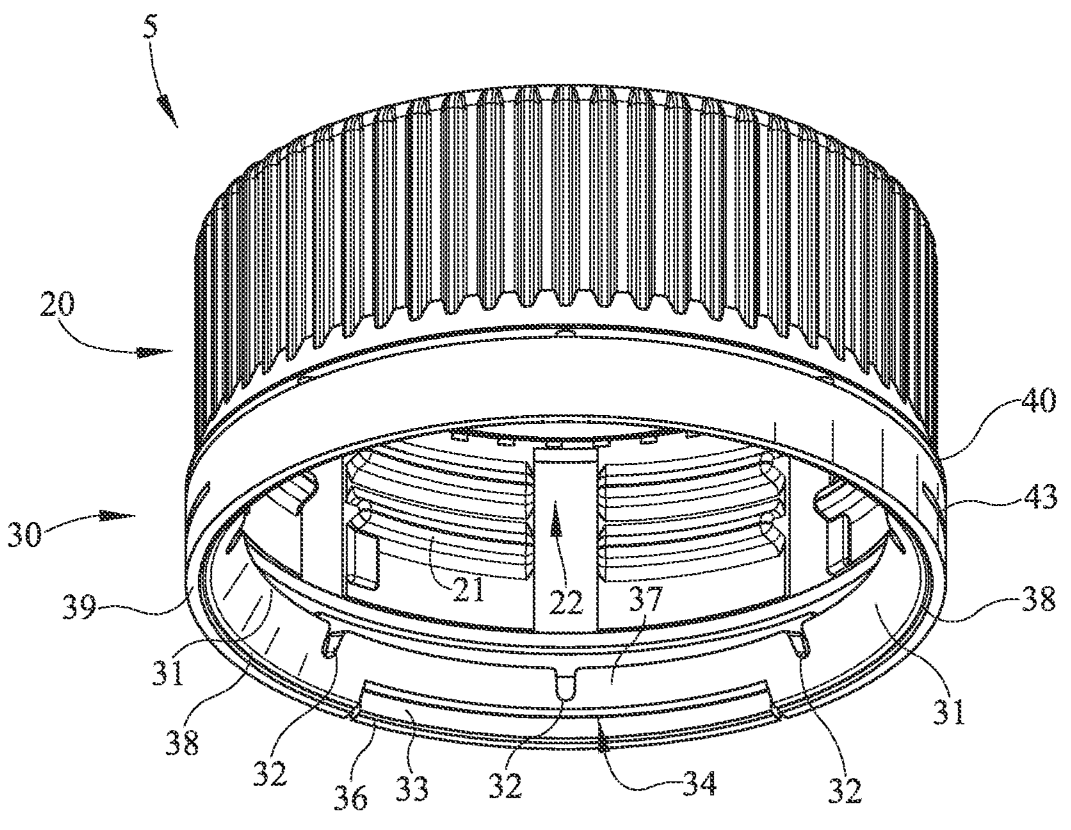
FIG. 2 illustrates a bottom perspective view of the closure of FIG. 1.

Tamper band 30 and/or closure 5 may include one or more segments 31, which may be arranged on a radially interior side of tamper band 30, and/or scallops 32, as shown for example in FIG. 2, to facilitate attachment and/or tamper evident removal of closure 5 from the bottle or container, or for any other reason. It is understood that scallops 32 or similar features are optional. Scallops 32, if included, may locally weaken segment(s) 31 to provide a local area for the segment(s) 31 to bend and/or fold to allow it to move into the position shown in FIG. 2. Segments 31 may be provided in a downwardly extended position, for example in which they extend downwardly and/or radially inwardly (not shown), such that when closure 5 is capped onto a bottle or container, the segments 31 may invert into the axially upwardly and radially inwardly extended position shown in FIG. 2. Scallops 32, if included, may facilitate the inversion of segments 31. It is understood that closure 5 may be provided with less than the number of scallops shown in FIG. 2 or with no scallops 32.

Figure 14:
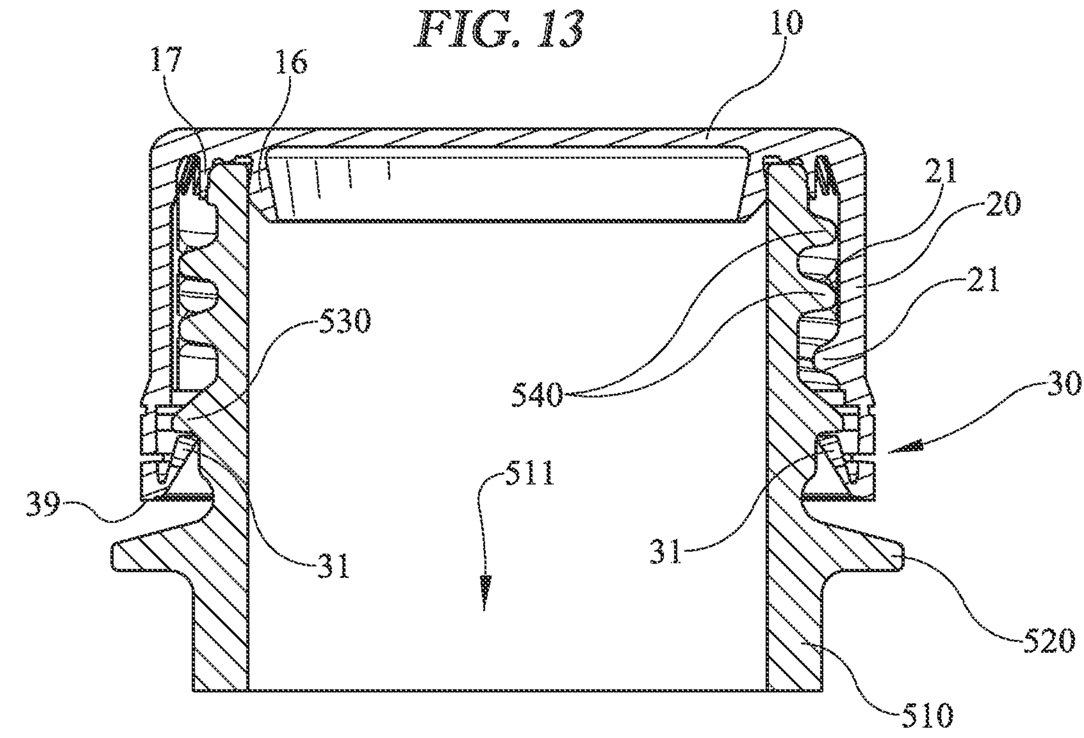
FIG. 14 illustrates a cross-section side view of the package of FIG. 13.
Figures 15, 16:
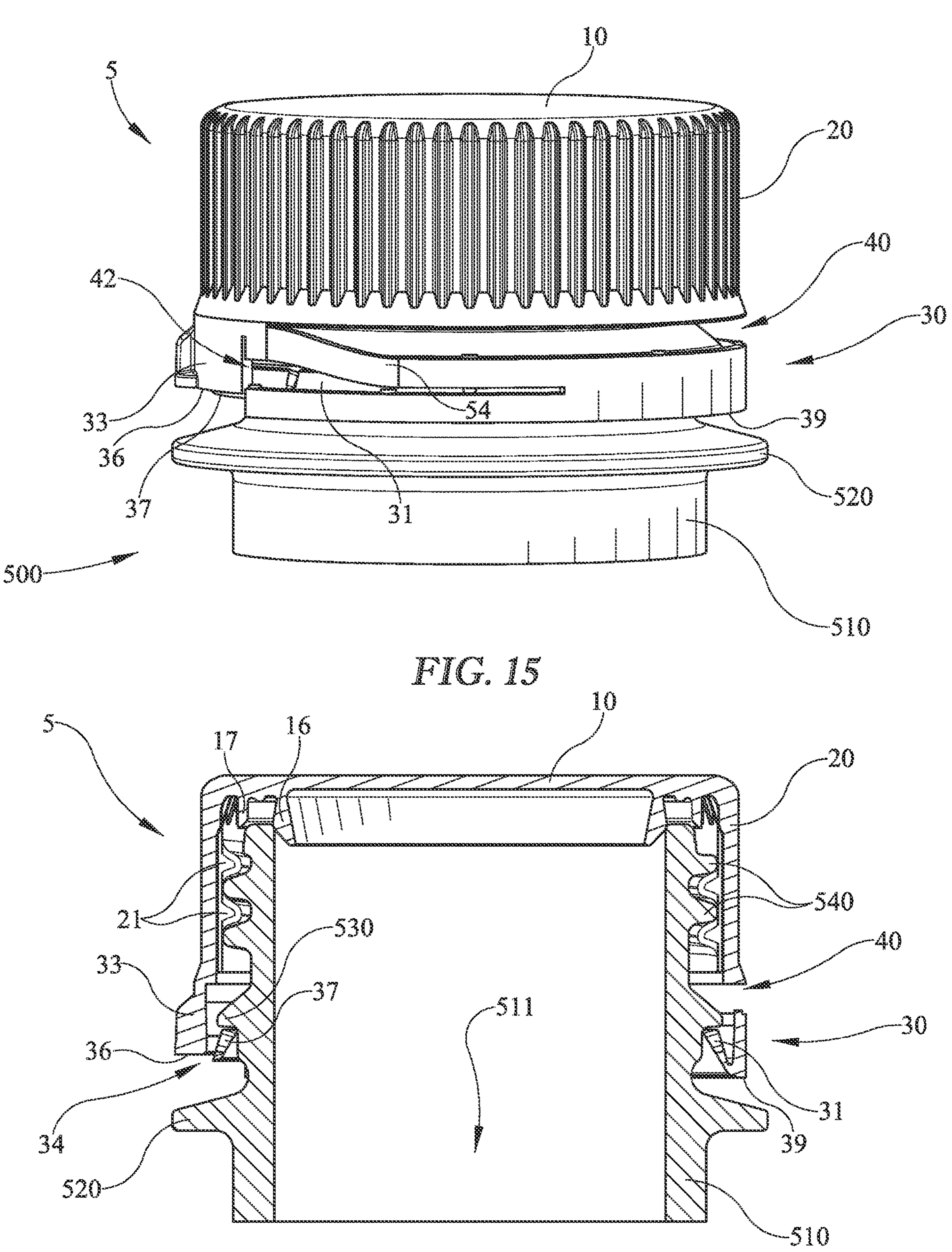
FIG. 15 illustrates a side view of the package of FIG. 13, now shown in a partially open position in which the closure has been moved vertically from the closed position relative to the container.
FIG. 16 illustrates a cross-section side view of the package of FIG. 15 shown in the partially open position.
Figure 17:
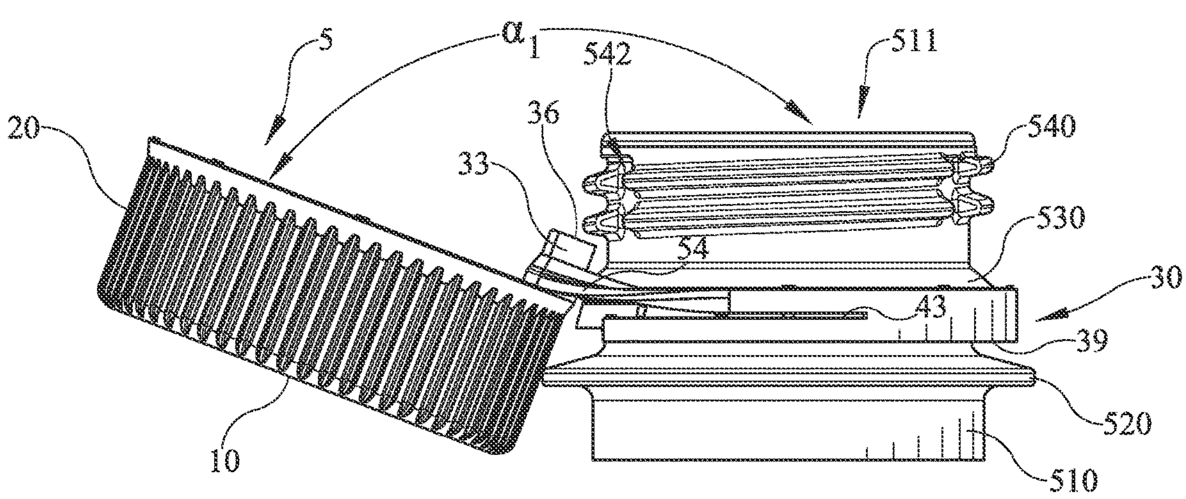
FIG. 17 illustrates a side view of the package of FIG. 15 now shown in an open position in which a tab of the closure abuts or engages a bead of the container.
Figure 18:
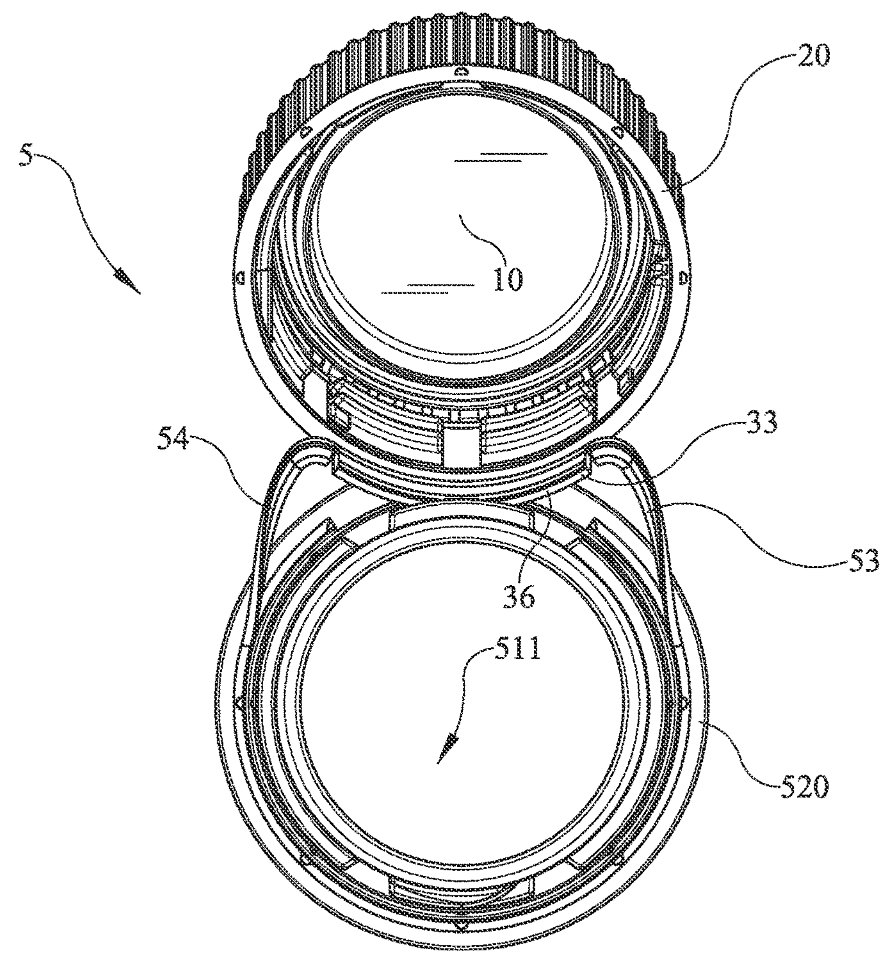
FIG. 18 illustrates a top view of the package of FIG. 17 shown in the open position.
Figure 19:
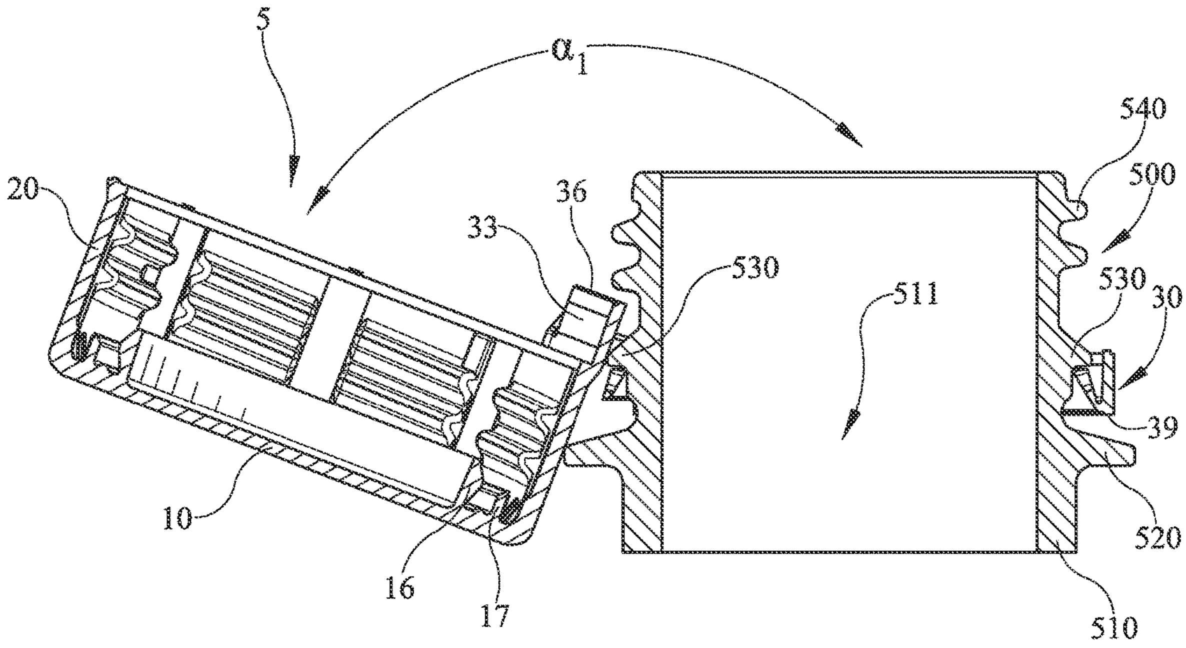
FIG. 19 illustrates a cross-section side view of the package of FIG. 17 shown in the open position.

For example, closure 5 may include one or more internal threads 21 that may be configured to engage corresponding external threads of the container. If included, threads 21 may include one or more vents 22 which may be provided, for example, to facilitate alleviating, equalizing, and/or slowly releasing pressure that may build up in the container as closure 5 is removed therefrom. Closure 5 may include a first seal 16 and/or a second seal 17 depending axially downwardly from cover 10 (see FIG. 14, for example). Second seal 17 may be configured to mate with an outer surface of a container neck 510 and/or be disposed radially outwardly of first seal 16, which may be configured to mate with an inner surface of container neck 510. At least a portion of tamper band 30, such as one or more segments 31 may extend downwardly prior to attachment of closure 5 to the container, such as during a capping operation on a beverage line, for example, and/or may be folded or inverted upwardly to facilitate holding and/or retaining tamper band 30 to the container. Scallops 32, if included, may facilitate folding, inverting, retention, and/or other aspect of tamper band 30.

To facilitate separation of skirt 20 from tamper band 30 while also allowing skirt 20 to remain attached or connected to tamper band 30, or for any other reason, closure 5 may include one or more separation areas or features such as a first cross separation area 40, a first transverse separation area 41, a second transverse separation area 42, and/or a second cross separation area 43. First cross separation area 40 may be a substantially horizontal gap or break that extends around some of the perimeter or circumference of closure 5, for example, between skirt 20 and some or all of tamper band 30. It is understood that first cross separation area 40 may be configured other than horizontally as shown in FIGS. 1-4, for example, by extending at an angle relative to the horizontal. First transverse separation area 41 and/or second transverse separation area 42 may be substantially transverse and/or perpendicular to first cross separation area 40 in such a way as to leave an area of material between them, such as at a first hinge 51 and/or a second hinge 52, and/or at a tab 33. First hinge 51, second hinge 52, and/or other areas of material that remain intact, and do not separate when closure 5 is opened relative to a container or bottle, may be provided to tether or retain connection of skirt 20 and tamper band 30 even after closure 5 has been opened. Any or all of the separation areas 40, 41, 42, and/or 43 may be areas or lines of thinned material, frangible material, weaker material, any combination thereof, and/or configured to be more easily separable than surrounding areas of material. For example, as shown in the embodiment of FIGS. 1-4, the separation areas may be molded into closure 5, which may be an injection molded closure 5, for example. First transverse separation area 41 and/or second transverse separation area 42 may be substantially vertical, substantially axial, and/or angled relative to a vertical direction and/or may be configured with a vertical component as well as a horizontal component. The areas of material between the respective scores may define at least partially one or more flaps, bridges, and/or hinges or other features, such as hinges 51, 52, and/or tab 33, for example.

Separation areas 40, 41, 42, and/or 43, and/or hinges 51, 52 may facilitate moving closure 5 between a closed position and an open position. For example, a user may twist open closure 5 causing separation of skirt 20 from band 30 at or near first cross separation area 40, which may be weaker and/or more easily separable than surrounding areas of skirt 20 and band 30. First cross separation area 40 may be or may include molded in gaps or breaks, which may or may not include one or more frangible connections or bridges that may be broken when the closure is moved from a closed position to an open position. The user may rotate closure 5 relative to an underlying container into the open position, for example, by rotating skirt 20 relative to band 30 and/or the container about either or both hinges 51, 52 and/or either or both of a first strap 53 and a second strap 54. Either or both of first transverse separation area 41 and second separation area 42 may be substantially formed at least partially through the thickness of closure 5 to facilitate rotation of skirt 20 relative to band 30. Either or both hinges 51, 52 may stretch and/or twist to accommodate moving closure 5 between the closed position and the opened position. For example, either or both hinges 51, 52 and or either or both straps 53, 54 may be formed of a stretchable and/or flexible thermoplastic material such as polypropylene (PP) and/or high-density polyethylene (HDPE), for example. Operation of closure 5 and/or movement of closure 5 between the opened and closed position or positions described herein may be similar or substantially the same as described in U.S. Pat. No. 11,505,372, granted to Bloom et al., which is incorporated by reference in its entirety herein.

To facilitate moving closure 5 between a closed position and one or more open positions, or for any other reason, first strap 53 and/or second strap 54 may be included. Either or both straps 53, 54 may be provided to give extra length, rotation, and/or flexibility to the material that remains connected between tamper band 30 and skirt 20 even after separation at separation areas 40, 41, 42, and/or 43, which may allow extra movement of skirt 20 relative to tamper band 30 during opening and closing. First strap 53 and/or second strap 54 may be substantially defined at areas of circumferential overlap of first cross separation area 40 and second cross separation area 43. Straps 53, 54 may be adjacent respective hinges 51, 52, and/or straps 53, 54 may be considered to include respective hinges 51, 52.

Rotation of skirt 20 relative to band 30 may result in a tab 33 that may flip upwardly when closure 5 is opened. Tab 33 may be provided between first hinge 51 and second hinge 52 and/or between first strap 53 and second strap 54, between first transverse separation area 41 and second transverse separation area 42, and/or may include material from a portion of at least one of skirt 20 and band 30. Tab 33 may rotate and/or invert about a hinge axis substantially along a line formed through first hinge 51 and second hinge 52. Tab 33 may include an outer surface 35 that may engage a container 500 to which closure 5 is coupled or attached, for example at a container bead 530 such as that shown and described in FIGS. 13-26, when in the open position. This contact or engagement of tab 33 with bead 530 may facilitate retaining closure 5 and/or skirt 20 in the open position, for example, by resisting rotation to flip closure 5 back into or toward the closed position. Closure 5 may be configured such that a user may overcome this resistance and selectively close closure 5 relative to container 500 and/or move closure 5 into the closed position. Either or both hinges 51, 52 and/or either or both straps 53, 54 may stretch or be stretched in the open position and/or during transition between open and closed positions. This stretching may induce tension that may facilitate retention in the open position and/or closed position, for example, by increasing friction between tab 33 and/or outer surface 35 and container bead 530, and/or the tension may provide or enhance a snap back type hinging mechanism. One or more areas of material may be provided to connect and/or provide a frangible connection between tab 33 and the rest of tamper band 30. For example, one or more frangible connections may connect tab 33 at a bottom area to a bottom area of the remaining tamper band 30, although it is understood that one or more frangible connections, if included, may be located elsewhere, for example, higher up in first transverse separation area 41 and/or second transverse separation area 41.

Figures 3, 4:
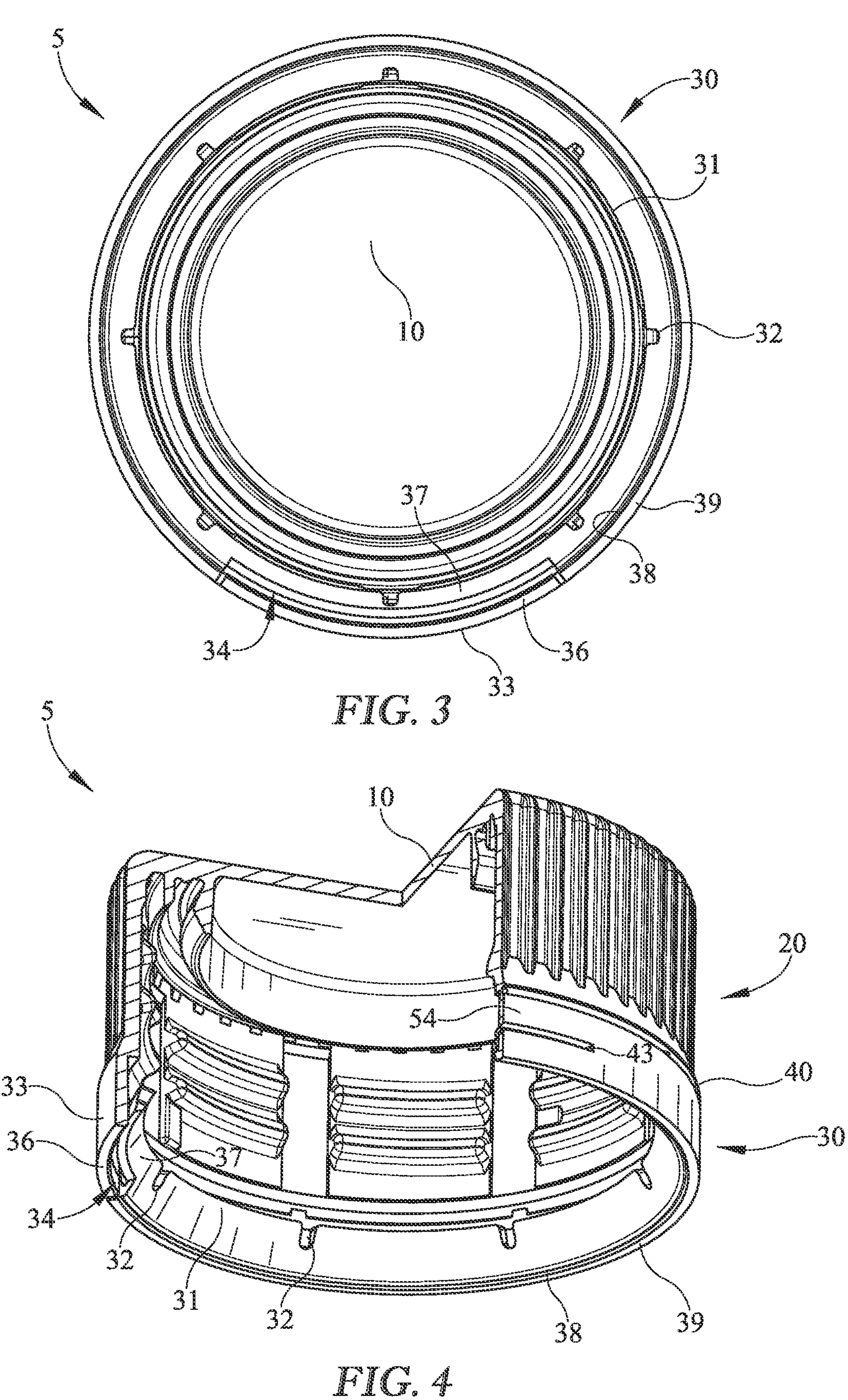
FIG. 3 illustrates a bottom view of the closure of FIG. 1.
FIG. 4 illustrates a perspective view of the closure of FIG. 1 shown in partial section to show a vent and other features in more detail.
Figure 5:
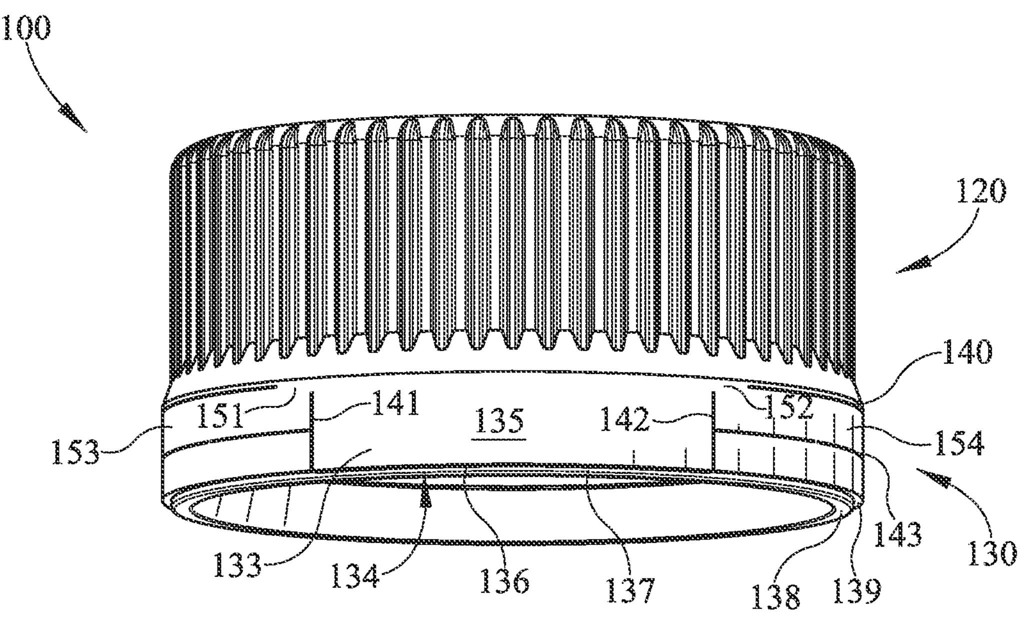
FIG. 5 illustrates a side perspective view of a second embodiment of a closure.

Closure 5 and/or tamper band 30 may include a tab aperture 34, which may be located behind tab 33 as shown for example in FIGS. 2 and 3. In this embodiment, tab aperture 34 may be molded into closure 5, for example, while closure 5 is being injection molded and/or contemporaneously with the formation of any or all of the separation areas 40, 41, 42, 43, any or all of which may also be molded in. Segments 31 may extend in a first axial direction to a segment bottom area or bottom edge 38 and/or the outer portion of tamper band 30 may extend in the first axial direction to a tamper band bottom area or bottom edge 39. Tab aperture 34 may be located adjacent segment bottom area 38 and/or tamper band bottom area 39. Tab 33 may extend in the first axial direction to a tab bottom 36. Tab bottom 36 may be substantially axially aligned with and/or coplanar with tamper band bottom edge 39. Tab aperture 34 may extend horizontally and/or circumferentially between first transverse separation area 41 and second transverse separation area 42. Tab aperture 34 may separate segment(s) 31 from tab 33 and/or the outer portion of tamper band 30. A segment bridge 37 may be provided to attach, couple, and/or connect segment(s) 31 horizontally or circumferentially across tab aperture 34.

Tab aperture 34 may be at least as wide as tab 33 in a horizontal or circumferential direction such that tab 33 may rotate relative to segments 31 and/or segment bridge 37 during opening of closure 5. Tab aperture 34 may have a width in the horizontal or circumferential direction that is equal to or greater than a width of tab 33 in the same direction. Tab aperture 34 may have an angular or arc length that is greater than an angular or arc length of tab 33. For example, first transverse separation area 41 and/or second transverse separation area 42 may be disposed circumferentially and/or angularly at and/or inside of tab aperture 34. In use, tamper band 30 may stay attached or coupled to a container (see FIG. 17, for example) while closure 5 is opened so that a user may access the contents of the underlying container. If tab aperture 34 is provided to separate tab 33 from segment bridge 37, then tab 33 is free to move and rotate relative to segment bridge 37 and segments 31 during opening and closing of closure 5 relative to tamper band 30, while segment bridge 37 continues to connect and/or structurally reinforce segments 31 and/or tamper band 30. It is understood that some connection between tab 33 and segment bridge 37 and/or segments 31 may remain within tab aperture 34, such as frangible connections, and/or stretchable or extendable connections, for example, and tab 33 could still move and/or rotate relative to segment bridge 37 and/or segments 31.

Segment bridge 37 may cooperate with other segment(s) 31 to provide a continuous band or ring of material that is continuous and uninterrupted over its length for any of a variety of reasons, including but not limited to providing hoop strength and/or structural rigidity. It is understood that without segment bridge 37, there could be a disconnect or discontinuity in segment(s) 31 that could weaken and/or reduce the structural rigidity of segment(s) 31 and/or tamper band 30. Tab aperture 34 may facilitate operation of closure 5, for example, by facilitating rotation and/or movement of tab 33 relative to the rest of tamper band 30 while the closure is being moved from the closed position to the open position. Segment bridge 37 may be provided with one or more scallops 32 as shown for example in FIG. 2, but it is understood that segment bridge 37 may be provided without a scallop 32, such that segment bridge 37 may have a substantially uniform height, measured axially for example, and/or thickness, measured radially for example.

The container to which closure 5 is attached or coupled may include a neck that defines an opening through which contents may be dispensed and/or poured. The container may include a transfer ring and/or flange 520 instead of or in addition to container bead 530 discussed above. Transfer ring or flange 520 may be provided for any of a variety of reasons, including but not limited to providing an area or surface that molding, bottling, capping, and/or conveying equipment may hold, for example, as the bottle is formed, filled, capped for example with closure 5, and/or transported. It is understood that a transfer ring or flange is optional. Flange 520, if included, may be configured so that it is relatively close to the bottom of closure 5 and/or the tamper band 30 to help prevent or inhibit tampering with closure 5 by minimizing the space between closure 5 and flange 520. Flange 520 may also or alternatively be configured with enough space between it and the bottom of closure 5 and/or tamper band 30 when closure 5 is installed on container 500 (e.g., during capping) to ensure that the installation or attachment of closure 5 and/or any portion thereof is not inhibited by contact with flange or transfer ring 520. Closure 5, tamper band 30, and/or flange or transfer ring 520 may be sized, shaped, oriented, and/or configured to minimize the space between closure 5 and transfer ring 520 while also ensuring enough space to prevent interference of the transfer ring and closure 5 during capping and/or otherwise.

If included, container bead 530 may project outwardly from container neck 510 and/or may engage tamper band 30 and/or tamper band segments 31 to prevent or inhibit tamper band 30 from traveling vertically upward relative to container neck 510. Removal of closure 5 from container 500, for example by rotating to unthread, may cause vertical upward motion relative to container 500. Closure 5 and/or a portion thereof, such as for example skirt 20, may separate from at least a portion of tamper band 30 during unthreading for instance due to the upward motion caused by unthreading skirt 20 contemporaneously with the blocking of upward motion by container bead 530.

A second embodiment of a closure 100 is illustrated in FIGS. 5-8. In this second embodiment, any or all of a first cross separation area 140, a first transverse separation area 141, a second transverse separation area 142, a second cross separation area 143, and a tab aperture 134 may be scored, cut, and/or slit into closure 5. For example, closure 5 may be formed, for example by injection or compression molding, and contemporaneously or subsequently cut or slit to form any or all of the separation areas 140, 141, 142, and 143 and/or tab aperture 134.

Some embodiments of a closure 100 may include a lid or cover 110 and/or a skirt 120, as shown for example in FIG. 1. Lid 110 may be configured to substantially block access to anything in, under, and/or covered by lid 110, such as a product storage region within a container. Skirt 120 may depend from lid 110 and may include an attachment feature such as an internal thread 121 for attachment to a container to be covered by closure 100. Lid 110 may include one or more sealing features, which may be, for example, of the plug fit or friction fit type, and/or a seal, gasket, liner, or the like.

Closure 100 may include a tamper band 130, as shown for example in FIGS. 5 through 8, which may be configured to at least partially separate from the rest of closure 100 when removed from an underlying bottle or container. Tamper band 130 may partially separate from skirt 120, for example, to allow closure 100 to be moved between an open position and a closed position relative to the container, while staying partially connected to skirt 120 and/or another portion of closure 100 to allow closure 100 to remain attached, coupled, and/or retained to the container via tamper band 130. Closure 100 and/or tamper band 130 may provide a visual indication to a user that closure 100 has been removed from the bottle or container by virtue of the separation of tamper band 130 from the rest of closure 100 and/or skirt 120. Tamper band 130 and/or closure 100 may include a plurality of segments 131 and/or scallops 132 to facilitate attachment and/or tamper evident removal of closure 100 from the bottle or container, or for any other reason. Closure 100 and/or any portion thereof may be configured to be removably attachable to the container.

For example, closure 100 may include one or more internal threads 121 that may be configured to engage corresponding external threads of the container. If included, threads 121 may include one or more vents 122 which may be provided, for example, to facilitate alleviating, equalizing, and/or slowly releasing pressure that may build up in the container as closure 100 is removed therefrom. Closure 100 may include a first seal 116 and/or a second seal 117 depending axially downwardly from cover 110. Second seal 117 may be configured to mate with an outer surface of a container neck 510 and/or be disposed radially outwardly of first seal 116, which may be configured to mate with an inner surface of container neck 510. At least a portion of tamper band 130, such as one or more segments 131 may extend downwardly prior to attachment of closure 100 to the container, such as during a capping operation on a beverage line, for example, and/or may be folded or inverted upwardly to facilitate holding and/or retaining tamper band 130 to the container. Scallops 132, if included, may facilitate folding, inverting, retention, and/or other aspect of tamper band 130.

To facilitate separation of skirt 120 from tamper band 130 while also allowing skirt 120 to remain attached or connected to tamper band 130, or for any other reason, closure 100 may include one or more separation areas or features such as a first cross separation area 140, a first transverse separation area 141, a second transverse separation area 142, and/or a second cross separation area 143. First cross separation area 140 may be a substantially horizontal gap or break that extends around some of the perimeter or circumference of closure 100, for example, between skirt 120 and some or all of tamper band 130. It is understood that first cross separation area 140 may be configured other than horizontally as shown in FIGS. 5-8, for example, by extending at an angle relative to the horizontal. First transverse separation area 141 and/or second transverse separation area 142 may be substantially transverse and/or perpendicular to first cross separation area 140 in such a way as to leave an area of material between them, such as at a first hinge 151 and/or a second hinge 152, and/or at a tab 133. First hinge 151, second hinge 152, and/or other areas of material that remain intact, and do not separate when closure 100 is opened relative to a container or bottle, may be provided to tether or retain connection of skirt 120 and tamper band 130 even after closure 100 has been opened. Any or all of the separation areas 140, 141, 142, and/or 143 may be areas or lines of thinned material, frangible material, weaker material, any combination thereof, and/or configured to be more easily separable than surrounding areas of material.

For example, as shown in the embodiment of FIGS. 5-8, the separation areas may be cut, slit, or scored into closure 100, which may be a molded closure 100, for example a compression molded closure 100. First transverse separation area 141 and/or second transverse separation area 142 may be substantially vertical, substantially axial, and/or angled relative to a vertical direction and/or may be configured with a vertical component as well as a horizontal component. The areas of material between the respective scores may create one or more flaps, bridges, and/or hinges or other features, such as hinges 151, 152, and/or tab 133, for example.

Separation areas 140, 141, 142, and/or 143, and/or hinges 151, 152 may facilitate moving closure 100 between a closed position and an open position. For example, a user may twist open closure 100 causing separation of skirt 120 from band 130 at or near first cross separation area 140, which may be weaker and/or more easily separable than surrounding areas of skirt 120 and band 130. First cross separation area 140 may be or may include cut, scored, or slit gaps or breaks, which may or may not include one or more frangible connections or bridges that may be broken when the closure is moved from a closed position to an open position. The user may rotate closure 100 relative to an underlying container into the open position, for example, by rotating skirt 120 relative to band 130 and/or the container about either or both hinges 151, 152 and/or either or both of a first strap 153 and a second strap 154. Either or both of first transverse separation area 141 and second separation area 142 may be substantially formed at least partially through the thickness of closure 100 to facilitate rotation of skirt 120 relative to band 130. Either or both hinges 151, 152 may stretch and/or twist to accommodate moving closure 100 between the closed position and the opened position. For example, either or both hinges 151, 152 and or either or both straps 153, 154 may be formed of a stretchable and/or flexible thermoplastic material such as polypropylene (PP) and/or high-density polyethylene (HDPE).

To facilitate moving closure 100 between a closed position and one or more open positions, or for any other reason, first strap 153 and/or second strap 154 may be included. Either or both straps 153, 154 may be provided to give extra length, rotation, and/or flexibility to the material that remains connected between tamper band 130 and skirt 120 even after separation at separation areas 140, 141, 142, and/or 143, which may allow extra movement of skirt 120 relative to tamper band 130 during opening and closing. First strap 153 and/or second strap 154 may be substantially defined at areas of circumferential overlap of first cross separation area 140. Straps 153, 154 may be adjacent respective hinges 151, 152, and/or straps 153, 154 may be considered to include respective hinges 151, 152.

Figure 6:
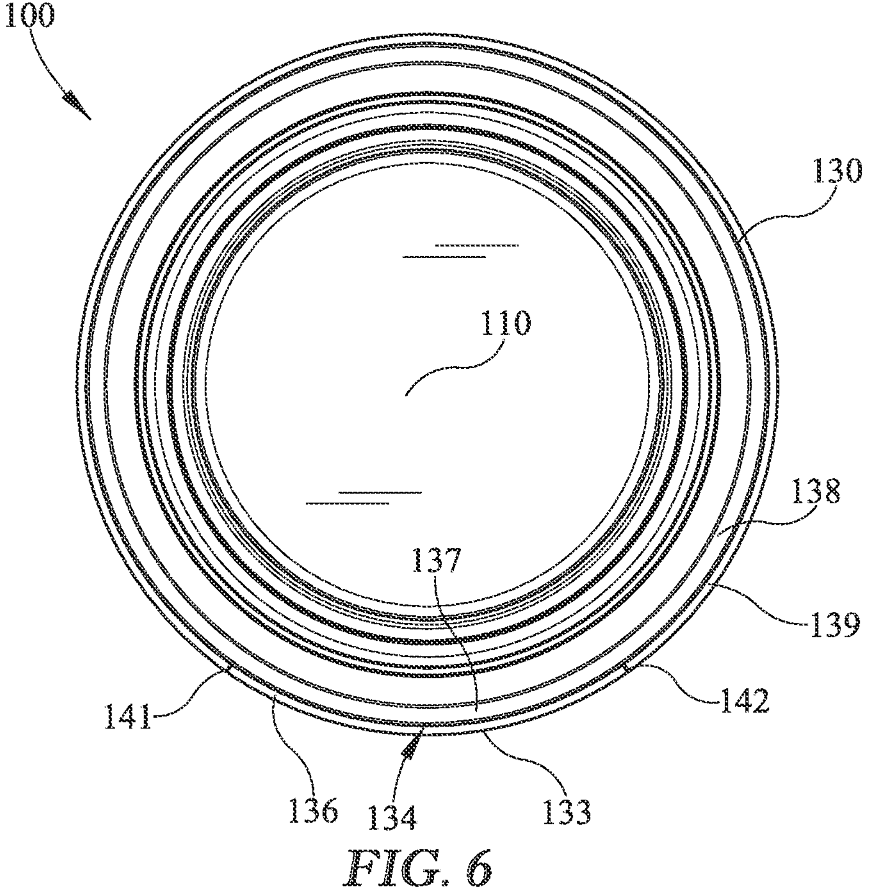
FIG. 6 illustrates a bottom view of the closure of FIG. 5.
Figure 7:
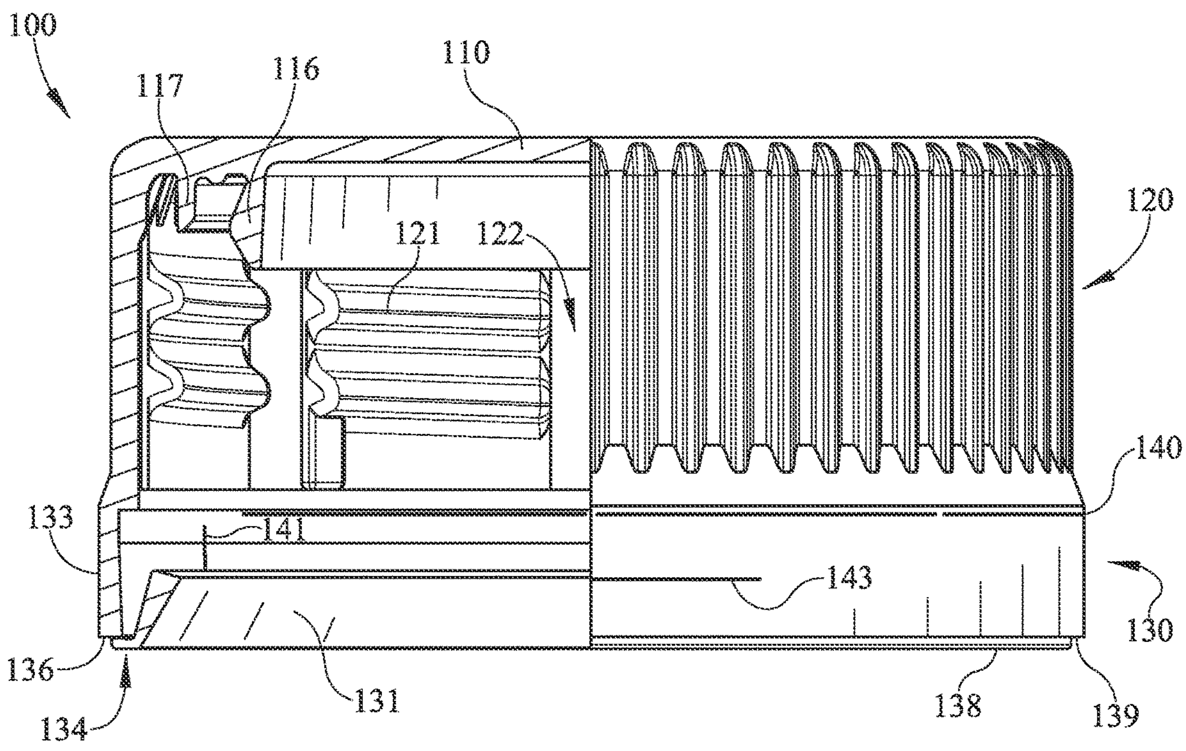
FIG. 7 illustrates a perspective view of the closure of FIG. 5 shown in partial section to show a vent and other features in more detail.
Figure 8:
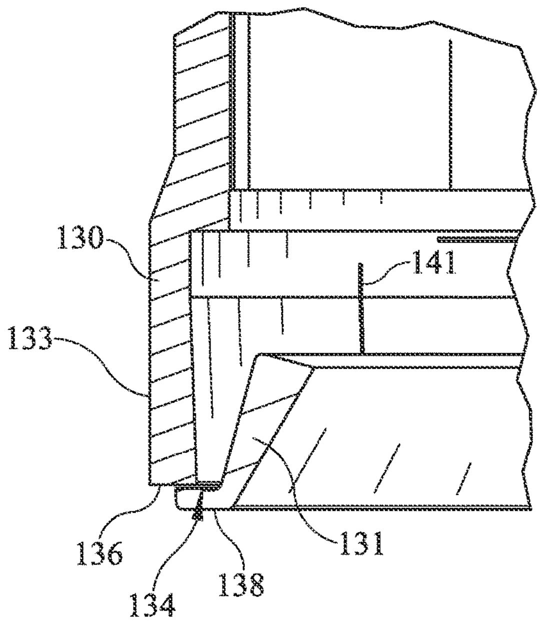
FIG. 8 illustrates a close up view of a portion of the closure and vent shown in FIG. 7.

Closure 100 and/or tamper band 130 may include a tab aperture 134, which may be located behind tab 133 as shown for example in FIGS. 6 through 8. In this embodiment, tab aperture 134 may be cut, scored, or slit or otherwise formed into closure 100, for example, after closure 100 has been molded (e.g., compression molded) and/or contemporaneously with the formation of any or all of the separation areas 140, 141, 142, 143. Segments 131 may extend to a segment bottom area or bottom edge 138 and/or the outer portion of tamper band 130 may extend to a tamper band bottom area or bottom edge 139. Tab aperture 134 may be located adjacent segment bottom area 138 and/or tamper band bottom area 139. Tab 133 may have a tab bottom 136. Tab bottom 136 may be substantially axially aligned with and/or coplanar with tamper band bottom edge 139. Tab aperture 134 may extend horizontally and/or circumferentially between first transverse separation area 141 and second transverse separation area 142. Tab aperture 134 may separate segment(s) 131 radially and/or axially from tab 133 and/or the outer portion of tamper band 130, and/or a segment bridge 137 may connect segment(s) 131 horizontally or circumferentially across tab aperture 134. Segment bridge 137 may cooperate with other segment(s) 131 to provide a continuous band or ring of material that is continuous and uninterrupted over its length for any of a variety of reasons, including but not limited to providing hoop strength and/or structural rigidity. Tab aperture 134 may facilitate operation of closure 100, for example, by facilitating rotation and/or movement of tab 133 relative to the rest of tamper band 130 while the closure is being moved from the closed position to the open position.

A third embodiment of a closure 200 is illustrated in FIGS. 9-12. In this third embodiment, any or all of a first cross separation area 240, a first transverse separation area 241, a second transverse separation area 242, and a second cross separation area 243 may be scored, cut, and/or slit into closure 200. In this embodiment, a tab aperture 234 may be formed in closure 200 while closure 200 is being formed.

For example, closure 200 may be formed with tab aperture 234, for example by injection molding, and contemporaneously or subsequently cut or slit to form any or all of the separation areas 240, 241, 242, and 243.

Figure 9:
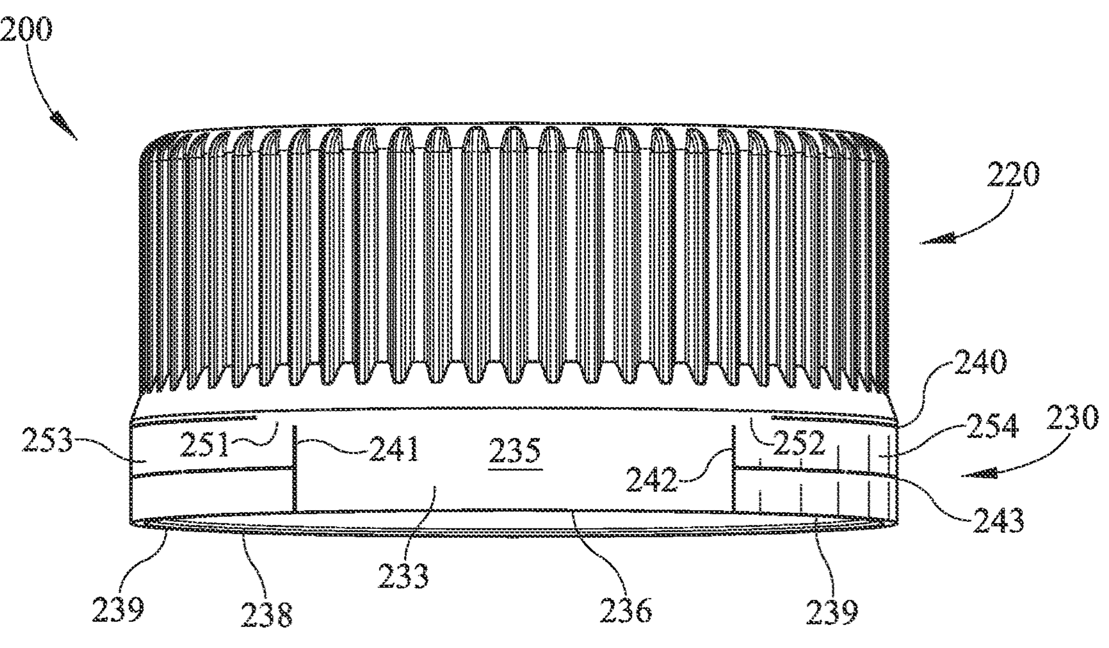
FIG. 9 illustrates a side perspective view of a third embodiment of a closure.

Some embodiments of a closure 200 may include a lid or cover 210 and/or a skirt 220, as shown for example in FIG. 9. Lid 210 may be configured to substantially block access to anything in, under, and/or covered by lid 210, such as a product storage region within a container. Skirt 220 may depend from lid 210 and may include an attachment feature such as an internal thread 221 for attachment to a container to be covered by closure 200. Lid 210 may include one or more sealing features, which may be, for example, of the plug fit or friction fit type, and/or a seal, gasket, liner, or the like.

Closure 200 may include a tamper band 230, as shown for example in FIGS. 9 through 12, which may be configured to at least partially separate from the rest of closure 200 when removed from an underlying bottle or container. Tamper band 230 may partially separate from skirt 220, for example, to allow closure 200 to be moved between an open position and a closed position relative to the container, while staying partially connected to skirt 220 and/or another portion of closure 200 to allow closure 200 to remain attached, coupled, and/or retained to the container via tamper band 230. Closure 200 and/or tamper band 230 may provide a visual indication to a user that closure 200 has been removed from the bottle or container by virtue of the separation of tamper band 230 from the rest of closure 200 and/or skirt 220. Tamper band 230 and/or closure 200 may include a plurality of segments 231 and/or scallops 232 to facilitate attachment and/or tamper evident removal of closure 200 from the bottle or container, or for any other reason. Closure 200 and/or any portion thereof may be configured to be removably attachable to the container.

For example, closure 200 may include one or more internal threads 221 that may be configured to engage corresponding external threads of the container. If included, threads 221 may include one or more vents 222 which may be provided, for example, to facilitate alleviating, equalizing, and/or slowly releasing pressure that may build up in the container as closure 200 is removed therefrom. Closure 200 may include a first seal 216 and/or a second seal 217 depending axially downwardly from cover 210. Second seal 217 may be configured to mate with an outer surface of a container neck 510 and/or be disposed radially outwardly of first seal 216, which may be configured to mate with an inner surface of container neck 510. At least a portion of tamper band 230, such as one or more segments 231 may extend downwardly prior to attachment of closure 200 to the container, such as during a capping operation on a beverage line, for example, and/or may be folded or inverted upwardly to facilitate holding and/or retaining tamper band 230 to the container. Scallops 232, if included, may facilitate folding, inverting, retention, and/or other aspect of tamper band 230.

To facilitate separation of skirt 220 from tamper band 230 while also allowing skirt 120 to remain attached or connected to tamper band 230, or for any other reason, closure 200 may include one or more separation areas or features such as a first cross separation area 240, a first transverse separation area 241, a second transverse separation area 242, and/or a second cross separation area 243. First cross separation area 240 may be a substantially horizontal gap or break that extends around some of the perimeter or circumference of closure 200, for example, between skirt 220 and some or all of tamper band 230. It is understood that first cross separation area 240 may be configured other than horizontally as shown in FIGS. 9-12, for example, by extending at an angle relative to the horizontal. First transverse separation area 241 and/or second transverse separation area 242 may be substantially transverse and/or perpendicular to first cross separation area 240 in such a way as to leave an area of material between them, such as at a first hinge 251 and/or a second hinge 252, and/or at a tab 233. First hinge 251, second hinge 252, and/or other areas of material that remain intact, and do not separate when closure 200 is opened relative to a container or bottle, may be provided to tether or retain connection of skirt 220 and tamper band 230 even after closure 200 has been opened. Any or all of the separation areas 240, 241, 242, and/or 243 may be areas or lines of thinned material, frangible material, weaker material, any combination thereof, and/or configured to be more easily separable than surrounding areas of material.

For example, as shown in the embodiment of FIGS. 9-12, the separation areas may be cut, slit, or scored into closure 200, which may be a molded closure 200, for example an injection molded closure 200. First transverse separation area 241 and/or second transverse separation area 242 may be substantially vertical, substantially axial, and/or angled relative to a vertical direction and/or may be configured with a vertical component as well as a horizontal component. The areas of material between the respective scores may create one or more flaps, bridges, and/or hinges or other features, such as hinges 251, 252, and/or tab 233, for example.

Separation areas 240, 241, 242, and/or 243, and/or hinges 251, 252 may facilitate moving closure 200 between a closed position and an open position. For example, a user may twist open closure 200 causing separation of skirt 220 from band 230 at or near first cross separation area 240, which may be weaker and/or more easily separable than surrounding areas of skirt 220 and band 230. First cross separation area 240 may be or may include cut, scored, or slit gaps or breaks, which may or may not include one or more frangible connections or bridges that may be broken when the closure is moved from a closed position to an open position. The user may rotate closure 200 relative to an underlying container into the open position, for example, by rotating skirt 220 relative to band 230 and/or the container about either or both hinges 251, 252 and/or either or both of a first strap 253 and a second strap 254. Either or both of first transverse separation area 241 and second separation area 242 may be substantially formed at least partially through the thickness of closure 200 to facilitate rotation of skirt 220 relative to band 230. Either or both hinges 251, 252 may stretch and/or twist to accommodate moving closure 200 between the closed position and the opened position. For example, either or both hinges 251, 252 and or either or both straps 253, 254 may be formed of a stretchable and/or flexible thermoplastic material such as polypropylene (PP) and/or high-density polyethylene (HDPE).

To facilitate moving closure 200 between a closed position and one or more open positions, or for any other reason, first strap 253 and/or second strap 254 may be included. Either or both straps 253, 254 may be provided to give extra length, rotation, and/or flexibility to the material that remains connected between tamper band 230 and skirt 220 even after separation at separation areas 240, 241, 242, and/or 243, which may allow extra movement of skirt 220 relative to tamper band 230 during opening and closing. First strap 253 and/or second strap 254 may be substantially defined at areas of circumferential overlap of first cross separation area 240. Straps 253, 254 may be adjacent respective hinges 251, 252, and/or straps 253, 254 may be considered to include respective hinges 251, 252.

Figure 10:
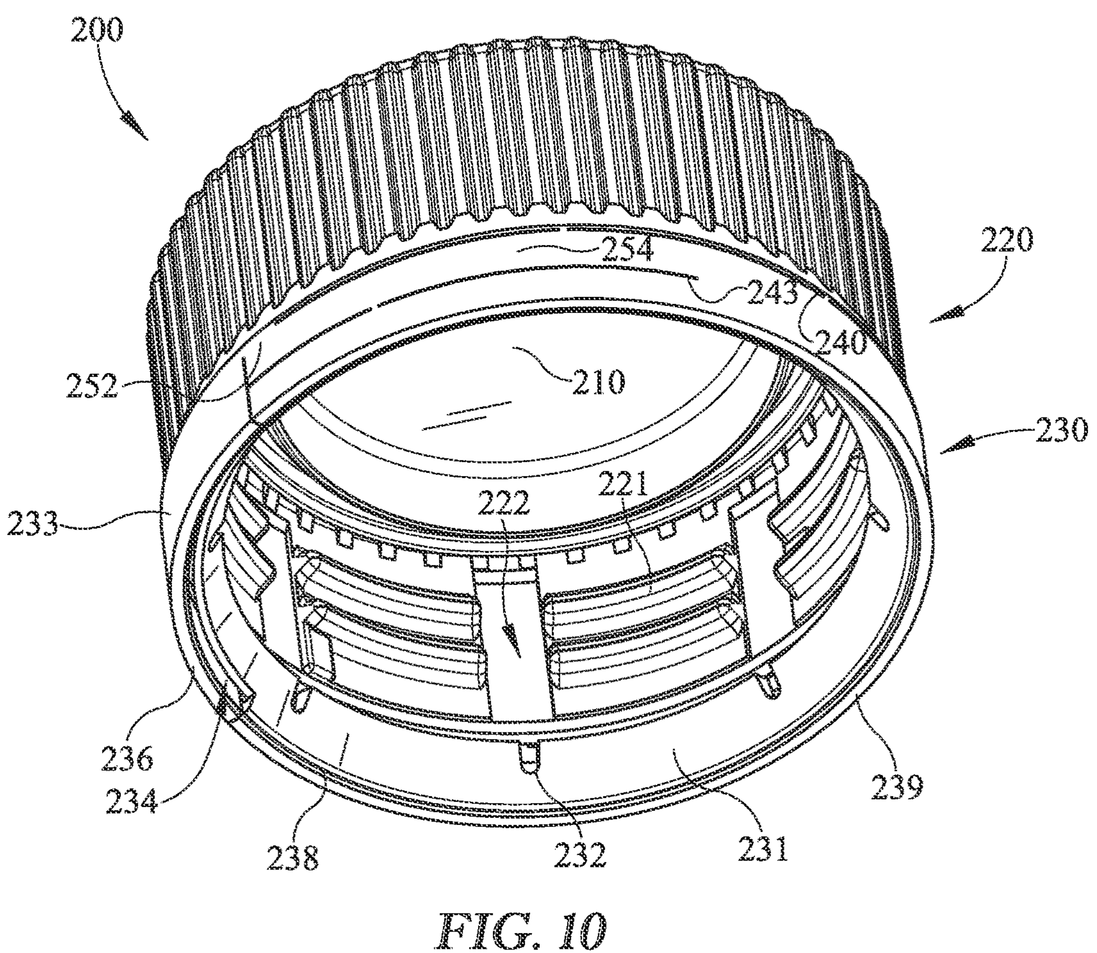
FIG. 10 illustrates a bottom perspective view of the closure of FIG. 9.
Figure 11:
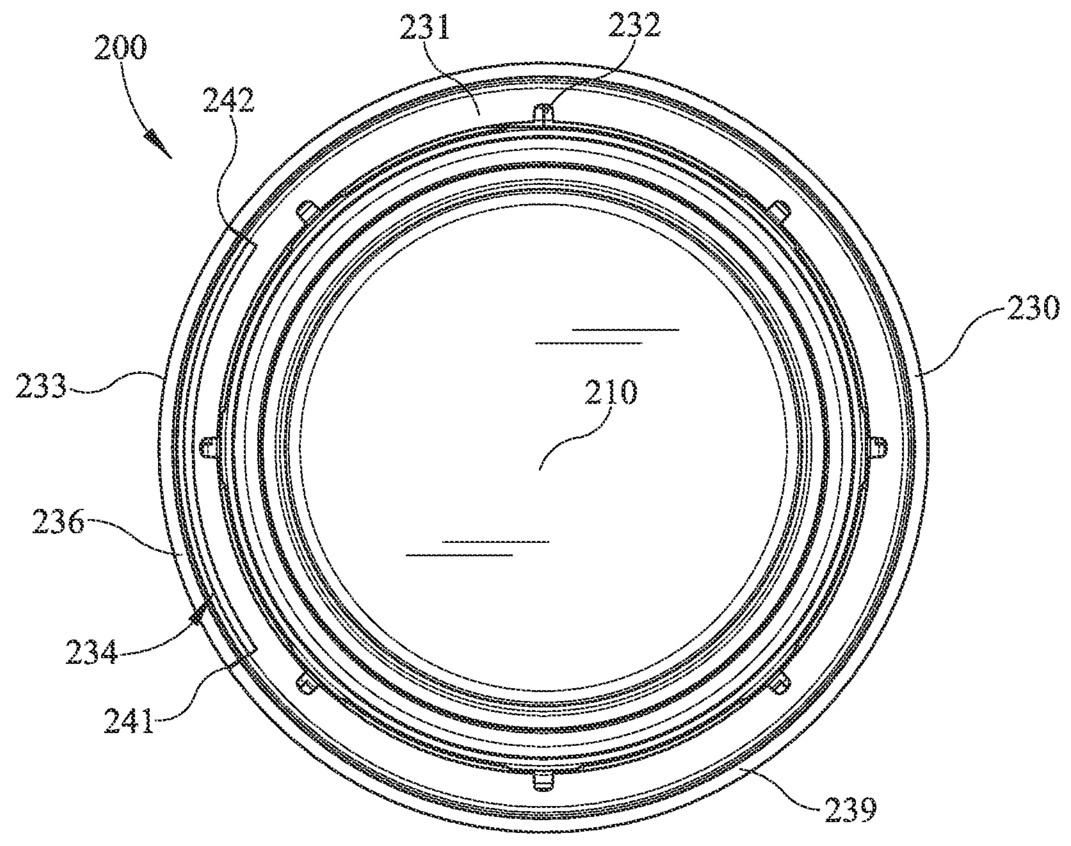
FIG. 11 illustrates a bottom view of the closure of FIG. 9.
Figure 12:
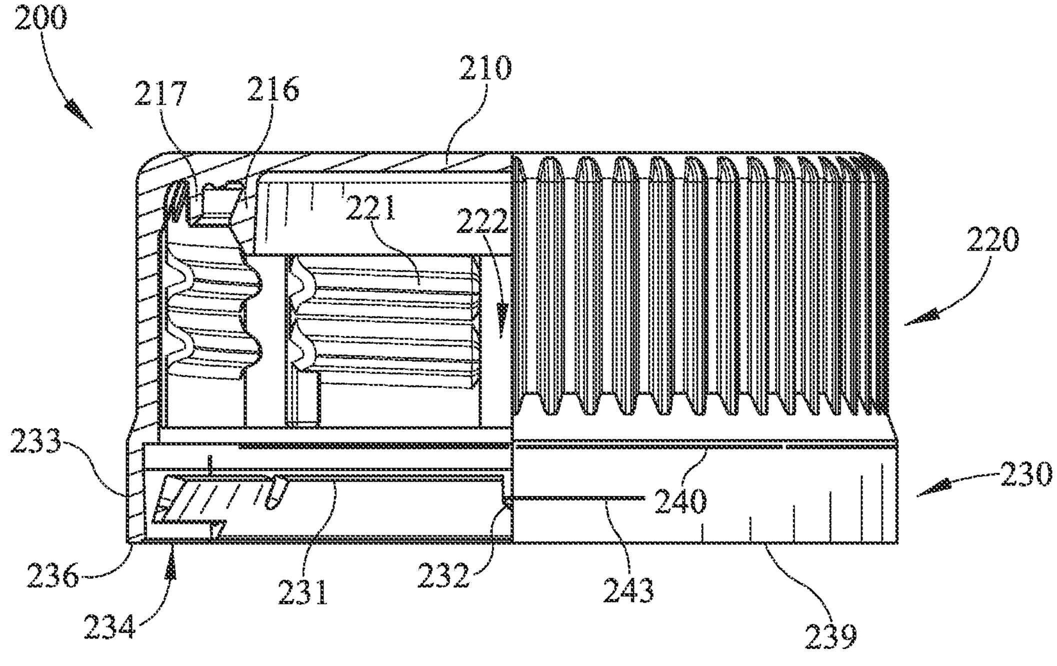
FIG. 12 illustrates a perspective view of the closure of FIG. 9 shown in partial section to show a vent and other features in more detail.
Figure 13:
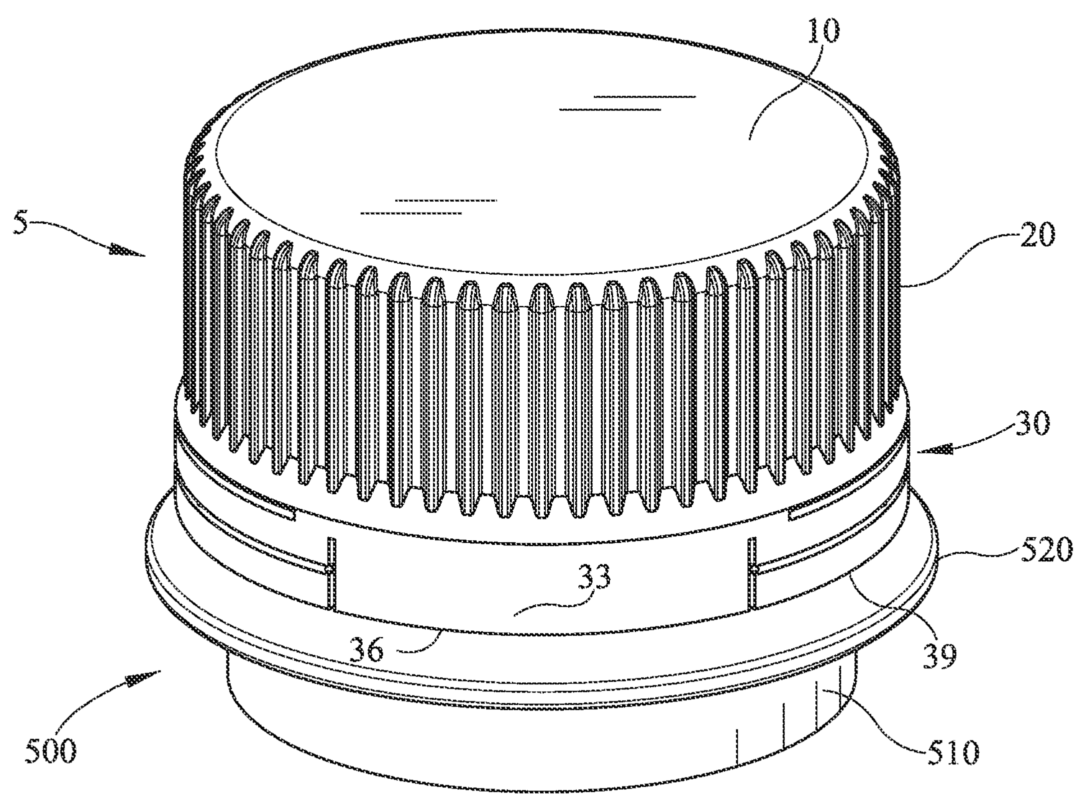
FIG. 13 illustrates a perspective view of the first embodiment of a closure shown in FIG. 1 now coupled to an exemplary embodiment of a container neck to form a package in a closed position.

Closure 200 and/or tamper band 230 may include a tab aperture 234, which may be located behind tab 233 as shown for example in FIGS. 10 through 12. In this embodiment, tab aperture 234 may be molded into closure 200, for example, while closure 200 is being molded (e.g., injection molded) and/or contemporaneously with the formation of any or all of the separation areas 240, 241, 242, 243. Segments 231 may extend to a segment bottom area or bottom edge 238 and/or the outer portion of tamper band 230 may extend to a tamper band bottom area or bottom edge 239. Tab aperture 234 may be located adjacent segment bottom area 238 and/or tamper band bottom area 239. Tab 233 may have a tab bottom 236. Tab bottom 236 may be substantially axially aligned with and/or coplanar with tamper band bottom edge 239. Tab aperture 234 may extend horizontally and/or circumferentially between first transverse separation area 241 and second transverse separation area 242. Tab aperture 234 may separate segment(s) 231 radially and/or axially from tab 233 and/or the outer portion of tamper band 230, and/or a segment bridge 237 may connect segment(s) 231 horizontally or circumferentially across tab aperture 234. Segment bridge 237 may cooperate with other segment(s) 231 to provide a continuous band or ring of material that is continuous and uninterrupted over its length for any of a variety of reasons, including but not limited to providing hoop strength and/or structural rigidity. Tab aperture 234 may facilitate operation of closure 200, for example, by facilitating rotation and/or movement of tab 233 relative to the rest of tamper band 230 while the closure is being moved from the closed position to the open position.

Regarding the formation of the separation areas and tab apertures in general in the first embodiment shown in FIGS. 1-4, the second embodiment shown in FIGS. 5-8, and the third embodiment shown in FIGS. 9-12, varying techniques may be employed, as described in more detail above. For example, FIGS. 1-4 illustrate separation areas 40, 41, 42, 43 being molded in as well as tab aperture 34 being molded in, which could all be molded in simultaneously during an injection molding operation, for example. For another example, FIGS. 5-8 illustrate separation areas 140, 141, 142, 143 and tab aperture 134 being slit or cut into tamper band 130, and in this example closure 5 may be injection molded and/or compression molded, for example. In yet another example, FIGS. 9-12 illustrate an embodiment in which slitting or cutting is used as well as molding in tab aperture 34, to show that a combination of operations may be used to form separation areas 240, 241, 242, 243 and tab aperture 234. In this example, tab aperture 234 is molded in during an injection molding operation and separation areas 240, 241, 242, 243 are slit or cut into tamper band 230. It is understood that any or all of the separation areas of the various embodiments may be cut in or may be molded in and they may be formed independent of how any other separation area is formed. Similarly, the tab apertures shown in the various embodiments may be formed independent of how any or all of the separation areas are formed.

As illustrated in FIGS. 13-19, closure 5 (or other closure disclosed herein) may be coupled to and/or attached to container 500. While closure 5 is shown in FIGS. 13-19, it is understood that closure 100, closure 200, and/or closure 300 (see below) could be coupled or attached with container 500 in similar fashion and/or operate in similar fashion as described below. Container 500 to which closure 5, 100, 200, 300 is attached or coupled may include neck 510 that defines an opening 511 through which contents may be dispensed and/or poured.

Container 500 may include transfer ring and/or a flange 520 instead of or in addition to container bead 530 mentioned above. A transfer ring or flange 520 may be provided for any of a variety of reasons, including but not limited to providing an area or surface that molding, bottling, capping, and/or conveying equipment may hold, for example, as the bottle 500 is formed, filled, capped for example with closure 5, 100, 200, 300 and/or transported. It is understood that transfer ring or flange 520 is optional. The flange 520, if included, may be configured so that it is relatively close to the bottom of closure 5 and/or the tamper band 30 to help prevent or inhibit tampering with closure 5 by minimizing the space between closure 5 and the flange 520. The flange 520 may also or alternatively be configured with enough space between it and the bottom of closure 5 and/or tamper band 30 when closure 5 is installed on the container 500 (e.g., during capping) to ensure that the installation or attachment of closure 5 and/or any portion thereof is not inhibited by contact with the flange or transfer ring 520. Closure 5, tamper band 30, and/or the flange or transfer ring 520 may be sized, shaped, oriented, and/or configured to minimize the space between closure 5 and the transfer ring 520 while also ensuring enough space to prevent interference of the transfer ring 520 and closure 5 during capping and/or otherwise.

If included, container bead 530 may project outwardly from container neck 510 and/or may engage tamper band 30 and/or tamper band segments 31 to prevent or inhibit tamper band 30 from traveling vertically upward relative to container neck 510. Removal of closure 5 from container 500, for example by rotating to unthread, may cause vertical upward motion relative to container 500. Closure 5 and/or a portion thereof, such as for example skirt 20, may separate from at least a portion of tamper band 30 during unthreading for instance due to the upward motion caused by unthreading skirt 20 contemporaneously with the blocking of upward motion by container bead 530. Skirt 20 and/or lid 10 of closure 5 may be rotated relative to tamper band 30 such that tab 33 and/or outer surface 35 of tab 33 may abut and/or engage container bead 530 to hold closure 5 in an open position shown for example in FIGS. 17 and 19. This abutment or engagement may facilitate holding closure 5, skirt 20, and/or lid 10 in an open position at a relatively wide first open angle $\alpha_1$ as shown for example in FIGS. 17 and 19. First open angle $\alpha_1$ may be in the range of about 155 to about 160 degrees, as shown for example in FIGS. 17 and 19, first angle $\alpha_1$ may be in the range of about 90 degrees to about 180 degrees, in the range of about 100 degrees to about 180 degrees, in the range of about 110 degrees to about 180 degrees, in the range of about 120 degrees to about 180 degrees, in the range of about 130 degrees to about 180 degrees, in the range of about 140 degrees to about 180 degrees, in the range of about 150 degrees to about 180 degrees, in the range of about 120 degrees to about 170 degrees, in the range of about 130 degrees to about 170 degrees, in the range of about 140 degrees to about 170 degrees, and/or in the range of about 150 degrees to about 160 degrees.

FIGS. 20-26 illustrate a fourth embodiment of a closure 300 as it may be coupled or attached to container 500. Closure 300 may include a tab protrusion 360, which may be disposed on tab 333 and/or tab outer surface 335, and/or opposite a tab aperture 334, and/or which may include either or both of a first extension 361 and a second extension 362.

As described more below, tab protrusion 360 or any portion thereof may be provided to facilitate retaining closure 300 in an open position relative to container 500, for example, or providing a relatively large second open angle $\alpha_2$, or for any other reason or combination of reasons. For example, tab protrusion 360 may be provided on tab 333 such that when closure 300 is in the open position relative to container 500, tab protrusion 360 may abut or engage container 500 or a portion thereof, such as bead 530. This abutment or engagement may facilitate holding closure 300 in an open position in which closure 300 and container 500 are held in a relatively wide second open angle $\alpha_2$ as shown for example in FIGS. 24 and 26.

Figure 24:
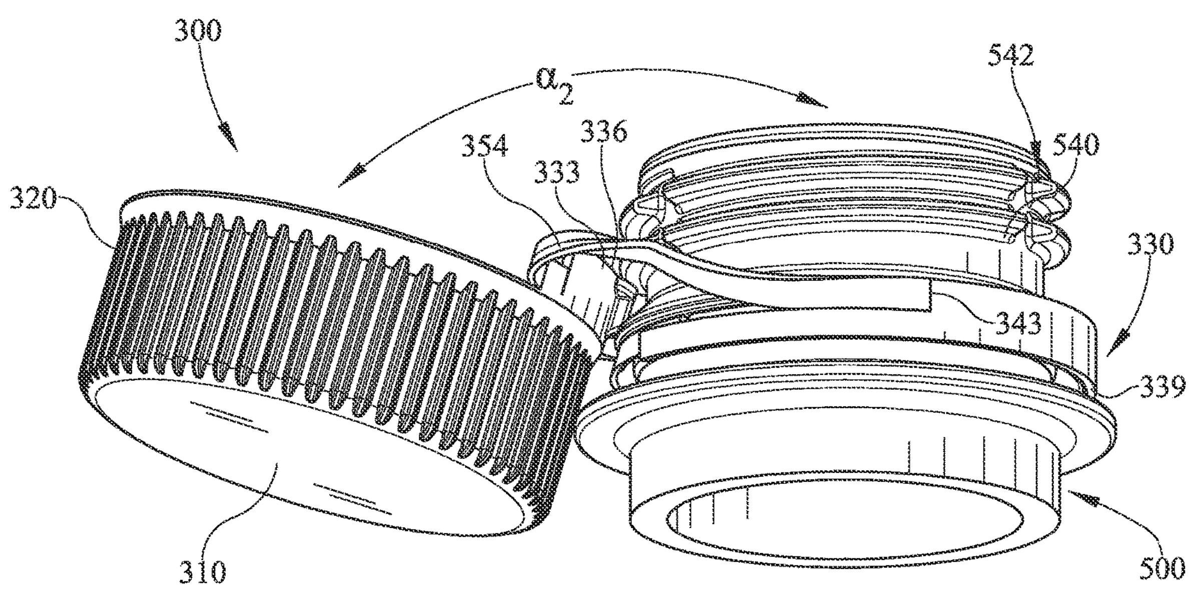
FIG. 24 illustrates a perspective view of the package of FIG. 22 shown in an open position.
Figure 25:
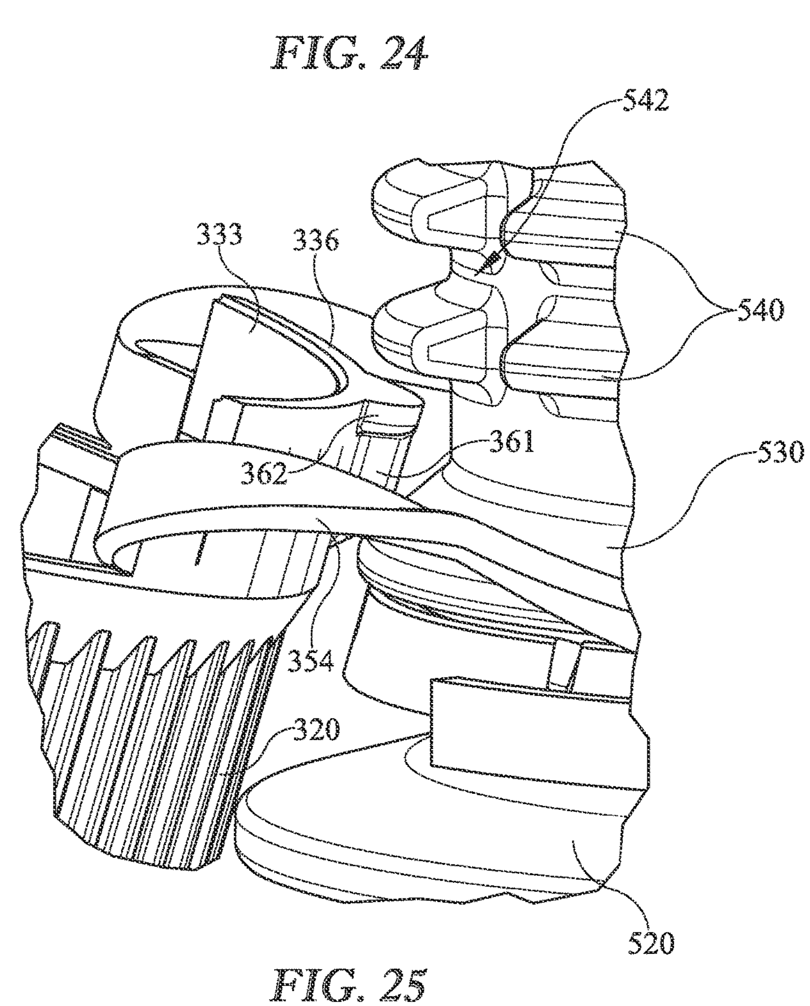
FIG. 25 illustrates a close up view of a portion of the package of FIG. 22 to illustrate a tab protrusion of a tab of the closure abutting or engaging a bead of the container to provide the package in the open position.
Figure 26:
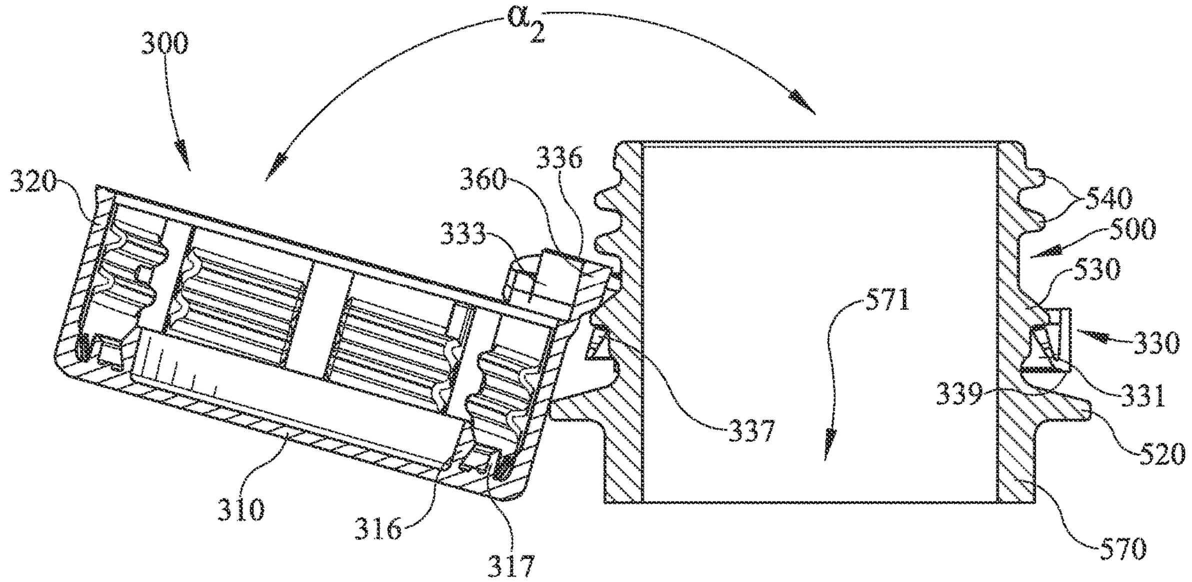
FIG. 26 illustrates a cross-section side view of the package of FIG. 25.

Tab protrusion 360 may be configured to lock or retain closure 300 in the open position shown in FIGS. 24 and 26 and/or to increase the angle at which closure 300 is held open. For example, first extension 361 may be configured to include an angled upper surface that may cooperate with the angled container bead 530 to lock closure 300 in the open position. First extension 361 and/or second extension 362 may protrude radially outwardly a predetermined distance to maintain second open angle $\alpha_2$ in a desired position. For example, second open angle $\alpha_2$ may be in the range of about 160 to about 165 degrees, as shown for example in FIGS. 24 and 26, second angle $\alpha_2$ may be in the range of about 90 degrees to about 180 degrees, in the range of about 100 degrees to about 180 degrees, in the range of about 110 degrees to about 180 degrees, in the range of about 120 degrees to about 180 degrees, in the range of about 130 degrees to about 180 degrees, in the range of about 140 degrees to about 180 degrees, in the range of about 150 degrees to about 180 degrees, in the range of about 120 degrees to about 170 degrees, in the range of about 130 degrees to about 170 degrees, in the range of about 140 degrees to about 170 degrees, and/or in the range of about 155 degrees to about 165 degrees. It is understood that either or both of first open angle $\alpha_1$ and second open angle $\alpha_2$, shown in FIGS. 17 and 19 as well as 24 and 26, respectively, could be varied and/or impacted based on the geometry of container 500. For example, the size and/or diameter of flange 520 and/or container bead 530 may be made smaller or larger to increase or decrease the open angle $\alpha_1$, $\alpha_2$. Furthermore, protrusion 360 or any component thereof may be configured based on the size and/or diameter of flange 520 and/or container bead 530 such that protrusion 360 may cooperate with the flange 520 and/or the container bead 530 to achieve the desired or predetermined second open angle @2.

Figure 20:
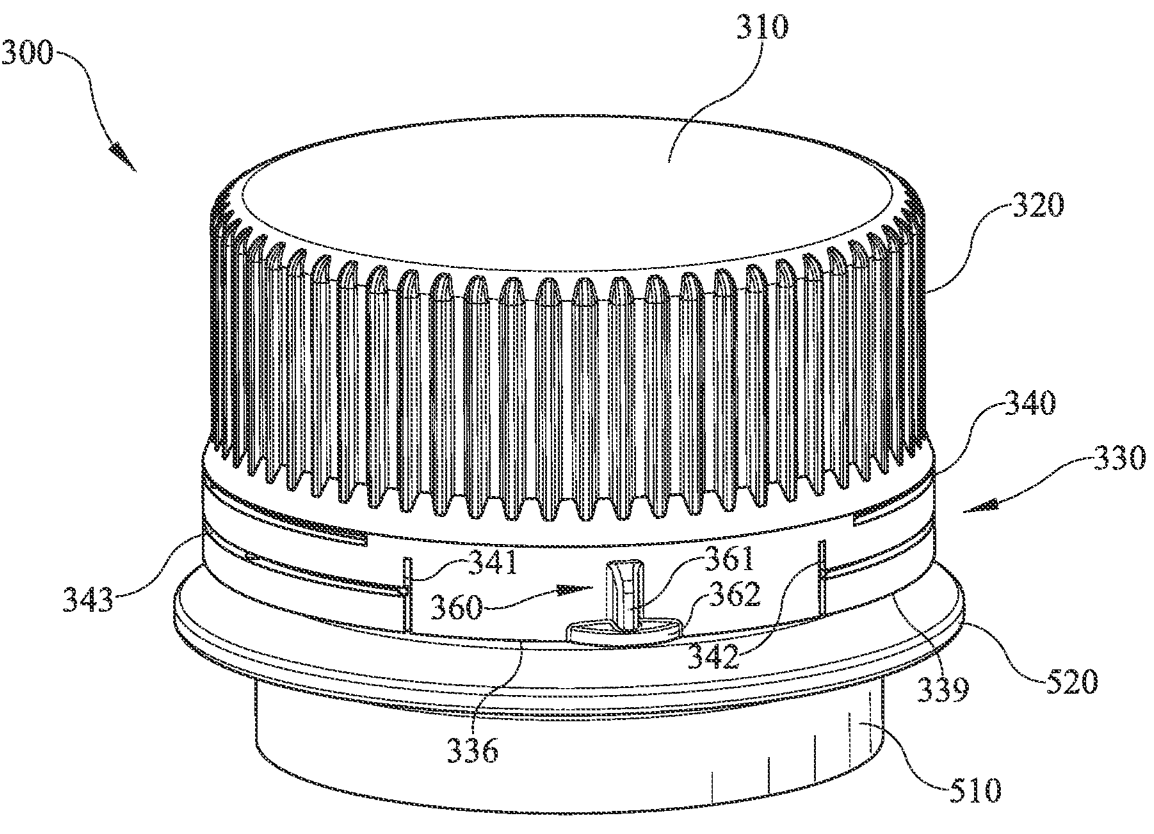
FIG. 20 illustrates a perspective view of a fourth embodiment of a closure coupled to a container neck to form another embodiment of a package in a closed position, the fourth embodiment of a closure including a tab protrusion.

Some embodiments of a closure 300 may include a lid or cover 310 and/or a skirt 320, as shown for example in FIG. 20. Lid 310 may be configured to substantially block access to anything in, under, and/or covered by lid 310, such as a product storage region within a container. Skirt 320 may depend from lid 310 and may include an attachment feature such as an internal thread 321 for attachment to a container to be covered by closure 300. Lid 310 may include one or more sealing features, which may be, for example, of the plug fit or friction fit type, and/or a seal, gasket, liner, or the like.

Figure 21:
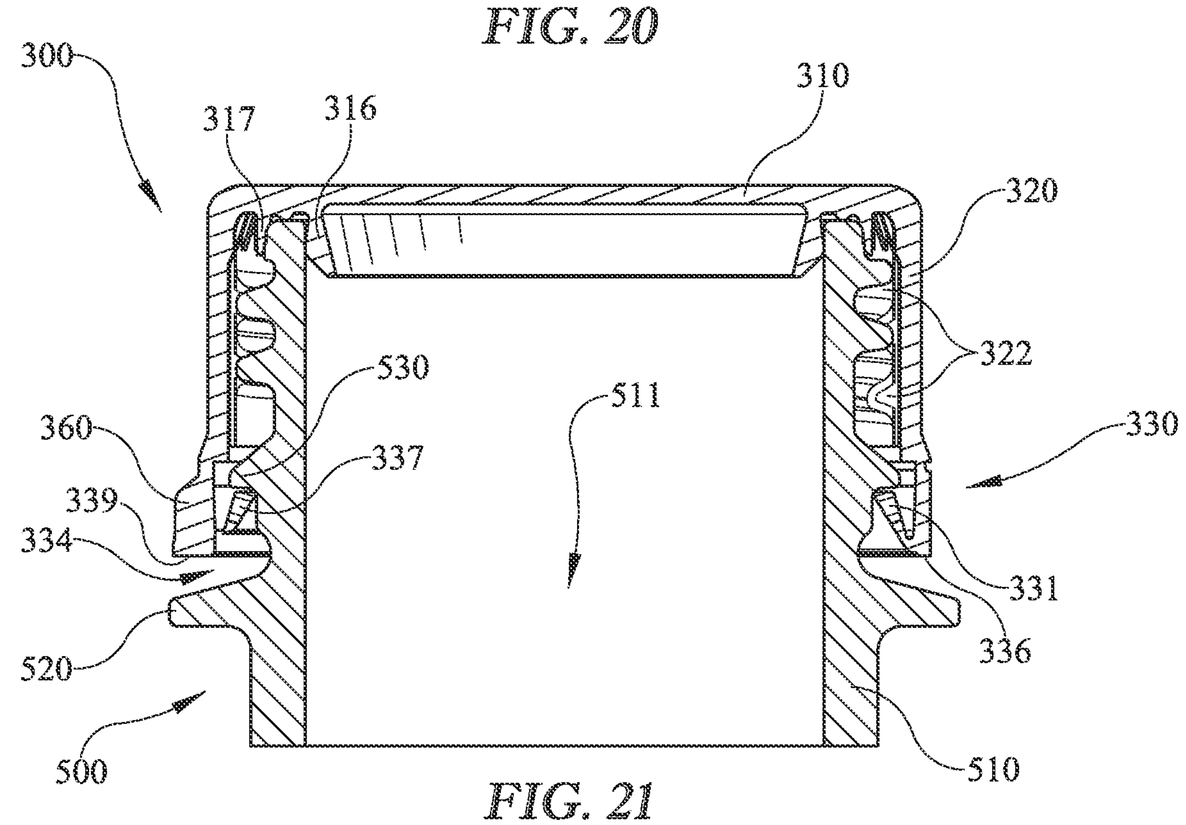
FIG. 21 illustrates a cross-section side view of the package of FIG. 20 in the closed position.
Figure 22:
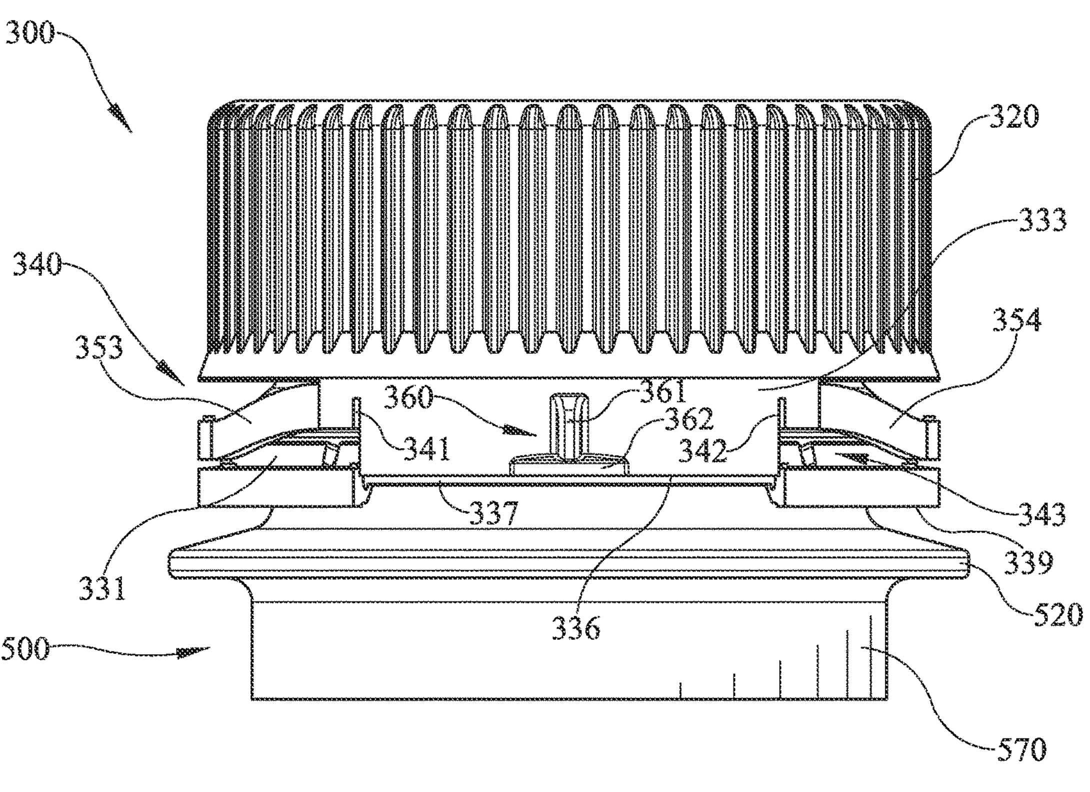
FIG. 22 illustrates a side view of a package in a partially open position that includes the closure of FIG. 20.
Figure 23:
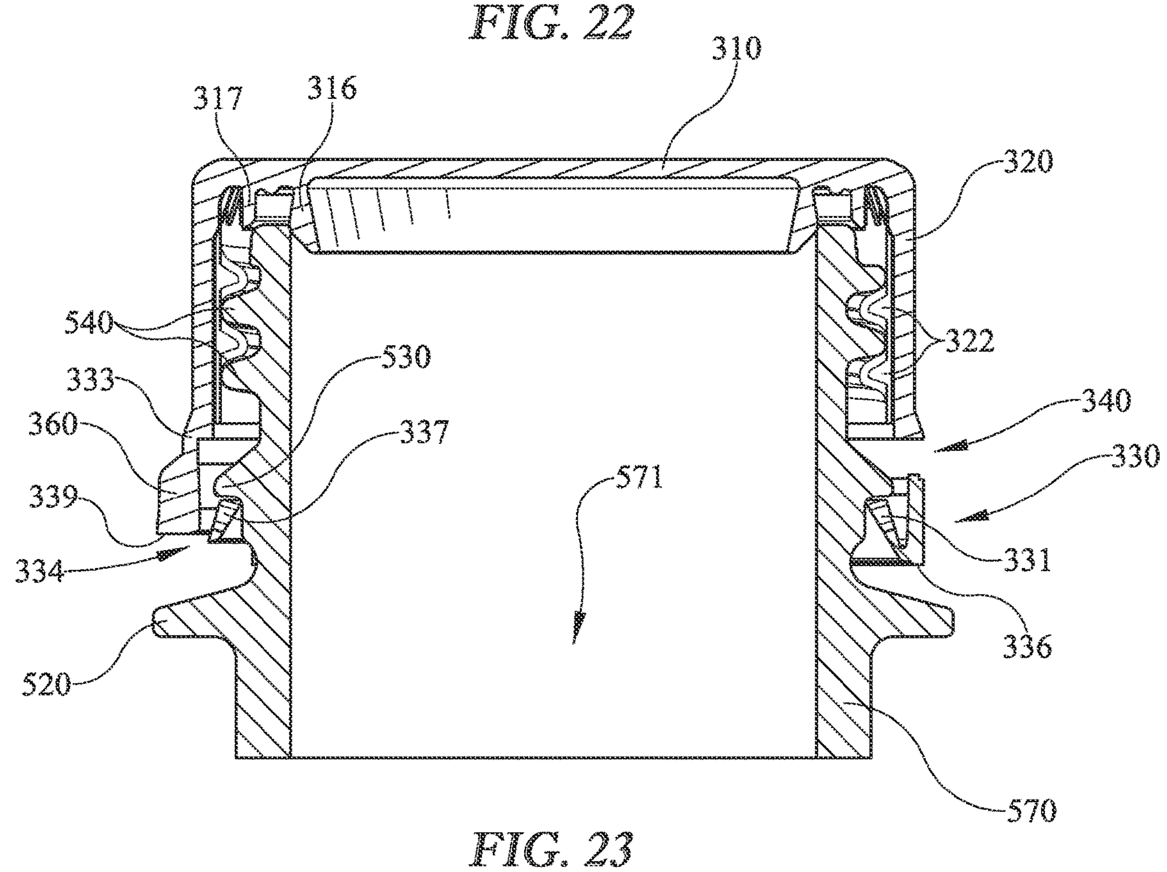
FIG. 23 illustrates a side cross-section view of the package of FIG. 22 in the partially open position.

Closure 300 may include a tamper band 330, as shown for example in FIGS. 20 and 21, which may be configured to at least partially separate from the rest of closure 300 when removed from underlying bottle or container 500. Tamper band 330 may partially separate from skirt 320, for example, to allow closure 300 to be moved between an open position and a closed position relative to the container, while staying partially connected to skirt 320 and/or another portion of closure 300 to allow closure 300 to remain attached, coupled, and/or retained to container 500 via tamper band 330. Closure 300 and/or tamper band 330 may provide a visual indication to a user that closure 300 has been removed from the bottle or container by virtue of the separation of tamper band 330 from the rest of closure 300 and/or skirt 320. Tamper band 330 and/or closure 300 may include a plurality of segments 331 and/or scallops 332 to facilitate attachment and/or tamper evident removal of closure 300 from the bottle or container, or for any other reason. Closure 300 and/or any portion thereof may be configured to be removably attachable to the container.

For example, closure 300 may include one or more internal threads 321 that may be configured to engage corresponding external threads of container 500. If included, threads 321 may include one or more vents 322 which may be provided, for example, to facilitate alleviating, equalizing, and/or slowly releasing pressure that may build up in the container as closure 300 is removed therefrom. Closure 300 may include a first seal 316 and/or a second seal 317 depending axially downwardly from cover 310. Second seal 317 may be configured to mate with an outer surface of a container neck 510 and/or be disposed radially outwardly of first seal 316, which may be configured to mate with an inner surface of container neck 510. At least a portion of tamper band 330, such as one or more segments 331 may extend downwardly prior to attachment of closure 300 to the container, such as during a capping operation on a beverage line, for example, and/or may be folded or inverted upwardly to facilitate holding and/or retaining tamper band 330 to container 500. Scallops 332, if included, may facilitate folding, inverting, retention, and/or other aspect of tamper band 330.

To facilitate separation of skirt 320 from tamper band 330 while also allowing skirt 320 to remain attached or connected to tamper band 330, or for any other reason, closure 300 may include one or more separation areas or features such as a first cross separation area 340, a first transverse separation area 341, a second transverse separation area 342, and/or a second cross separation area 343. First cross separation area 340 may be a substantially horizontal gap or break that extends around some of the perimeter or circumference of closure 300, for example, between skirt 320 and some or all of tamper band 330. It is understood that first cross separation area 340 may be configured other than horizontally as shown in FIGS. 20-21, for example, by extending at an angle relative to the horizontal. First transverse separation area 341 and/or second transverse separation area 342 may be substantially transverse and/or perpendicular to first cross separation area 340 in such a way as to leave an area of material between them, such as at a first hinge 351 and/or a second hinge 352, and/or at a tab 333. First hinge 351, second hinge 352, and/or other areas of material that remain intact, and do not separate when closure 300 is opened relative to a container or bottle, may be provided to tether or retain connection of skirt 320 and tamper band 330 even after closure 300 has been opened. Any or all of the separation areas 340, 341, 342, and/or 343 may be areas or lines of thinned material, frangible material, weaker material, any combination thereof, and/or configured to be more easily separable than surrounding areas of material. For example, as shown in the embodiment of FIGS. 20-21, the separation areas may be molded into closure 300, which may be an injection molded closure 300, for example. First transverse separation area 341 and/or second transverse separation area 342 may be substantially vertical, substantially axial, and/or angled relative to a vertical direction and/or may be configured with a vertical component as well as a horizontal component. The areas of material between the respective scores may create one or more flaps, bridges, and/or hinges or other features, such as hinges 351, 352, and/or tab 333, for example.

Separation areas 340, 341, 342, and/or 343, and/or hinges 351, 352 may facilitate moving closure 300 between a closed position and an open position. For example, a user may twist open closure 300 causing separation of skirt 320 from band 330 at or near first cross separation area 340, which may be weaker and/or more easily separable than surrounding areas of skirt 320 and band 330. First cross separation area 340 may be or may include molded in gaps or breaks, which may or may not include one or more frangible connections or bridges that may be broken when the closure is moved from a closed position to an open position. The user may rotate closure 300 relative to an underlying container into the open position, for example, by rotating skirt 320 relative to band 330 and/or the container about either or both hinges 351, 352 and/or either or both of a first strap 353 and a second strap 354. Either or both of first transverse separation area 341 and second separation area 342 may be substantially formed at least partially through the thickness of closure 300 to facilitate rotation of skirt 320 relative to band 330. Either or both hinges 351, 352 may stretch and/or twist to accommodate moving closure 300 between the closed position and the opened position. For example, either or both hinges 351, 352 and or either or both straps 353, 354 may be formed of a stretchable and/or flexible thermoplastic material such as polypropylene (PP) and/or high-density polyethylene (HDPE).

To facilitate moving closure 300 between a closed position and one or more open positions, or for any other reason, first strap 353 and/or second strap 354 may be included. Either or both straps 353, 354 may be provided to give extra length, rotation, and/or flexibility to the material that remains connected between tamper band 330 and skirt 320 even after separation at separation areas 340, 341, 342, and/or 343, which may allow extra movement of skirt 320 relative to tamper band 330 during opening and closing. First strap 353 and/or second strap 354 may be substantially defined at areas of circumferential overlap of first cross separation area 340. Straps 353, 354 may be adjacent respective hinges 351, 352, and/or straps 353, 354 may be considered to include respective hinges 351, 352.

Rotation of skirt 320 relative to band 330 may result in a tab 333 that may flip upwardly when closure 300 is opened. Tab 333 may be provided between first hinge 351 and second hinge 352 and/or between first strap 353 and second strap 354, between first transverse separation area 341 and second transverse separation area 342, and/or may include material from a portion of at least one of skirt 320 and band 330. Tab 333 may rotate and/or invert about a hinge axis substantially along a line formed through first hinge 351 and second hinge 352. Tab 333 may include an outer surface 335 that may engage a container 500 to which closure 300 is coupled or attached, for example at a container bead 530 such as that shown and described in FIGS. 13-26 when in the open position. This contact or engagement of tab 333 with bead 530 may facilitate retaining closure 300 and/or skirt 320 in the open position, for example, by resisting rotation to flip closure 300 back into or toward the closed position. Closure 300 may be configured such that a user may overcome this resistance and selectively close closure 300 relative to container 500 and/or move closure 300 into the closed position. Either or both hinges 351, 352 and/or either or both straps 353, 354 may stretch or be stretched in the open position and/or during transition between open and closed positions. This stretching may induce tension that may facilitate retention in the open position and/or closed position, for example, by increasing friction between tab 333 and/or outer surface 335 and container bead 530, and/or the tension may provide or enhance a snap back type hinging mechanism. One or more areas of material such as bridges may be provided to connect and/or provide a frangible connection between tab 333 and the rest of tamper band 330. For example, one or more bridges may connect tab 333 at a bottom area to a bottom area of the remaining tamper band 330, although it is understood that one or more bridges, if included, may be located elsewhere, for example, higher up in first transverse separation area 341 and/or second transverse separation area 341.

Closure 300 and/or tamper band 330 may include a tab aperture 334, which may be located behind tab 333 as shown for example in FIGS. 20 and 21. In this embodiment, tab aperture 334 may be molded into closure 300, for example, while closure 300 is being injection molded and/or contemporaneously with the formation of any or all of the separation areas 340, 341, 342, 343. Segments 331 may extend to a segment bottom area or bottom edge 338 and/or the outer portion of tamper band 330 may extend to a tamper band bottom area or bottom edge 339. Tab aperture 334 may be located adjacent segment bottom area 338 and/or tamper band bottom area 339. Tab 333 may have a tab bottom 336. Tab bottom 336 may be substantially axially aligned with and/or coplanar with tamper band bottom edge 339. Tab aperture 334 may extend horizontally and/or circumferentially between first transverse separation area 341 and second transverse separation area 342. Tab aperture 334 may separate segment(s) 331 radially and/or axially from tab 333 and/or the outer portion of tamper band 330, and/or a segment bridge 337 may connect segment(s) 331 horizontally or circumferentially across tab aperture 334. Segment bridge 337 may cooperate with other segment(s) 331 to provide a continuous band or ring of material that is continuous and uninterrupted over its length for any of a variety of reasons, including but not limited to providing hoop strength and/or structural rigidity. Tab aperture 334 may facilitate operation of closure 300, for example, by facilitating rotation and/or movement of tab 333 relative to the rest of tamper band 330 while the closure is being moved from the closed position to the open position.

It is understood that closure 5, 100, 200, 300 and/or an associated container, and/or any component thereof, may be made of any of a variety of materials, including, but not limited to, any of a variety of suitable plastics material, any other material, or any combination thereof. Suitable plastics material may include, but is not limited to, polypropylene (PP), polyethylene (PE), polyethylene terephthalate (PET), polystyrene (PS), high-density polyethylene (HDPE), low-density polyethylene (LDPE), linear low-density polyethylene (LLDPE), crystallized polyethylene terephthalate (CPET), mixtures and combinations thereof, or any other plastics material or any mixtures and combinations thereof. It is understood that multiple layers of material may be used for any of a variety of reasons, including to improve barrier properties, or to provide known functions related to multiple layer structures. The multiple layers, if included, may be of various materials, including but not limited to those recited herein.

It is further understood that a container and/or closure 5, 100, 200, 300 and/or any component thereof, may be substantially rigid, substantially flexible, a hybrid of rigid and flexible, or any combination of rigid, flexible, and/or hybrid, such as having some areas be flexible and some rigid. It is understood that these examples are merely illustrative, are not limiting, and are provided to illustrate the versatility of options available in various embodiments of container 500 and/or closure 5, 100, 200, 300, and/or any component thereof.

It is further understood that any of a variety of processes or combination thereof may be used to form container 500 and/or closure 5, 100, 200, 300 and/or any component thereof, or any layer or substrate used therein. For example, any component, layer, or substrate, or combination thereof, may be compression molded, thermoformed, injection molded, injection stretch blow molded, blow molded, extrusion blow molded, coextruded, subjected to any other suitable process, or subjected to any combination thereof. In some embodiments, a container and/or closure 5, 100, 200, 300 and/or any component thereof may be formed substantially of injection molded and/or thermoformed suitable plastics material, although other materials and forming processes may be used instead of or in addition to injection molding and thermoforming, respectively. Various materials and/or processes may be used to form a container and/or closure 5, 100, 200, 300 and/or any component thereof, as will be understood by one of ordinary skill in the art. In some embodiments, a container and/or closure 5, 100, 200 and/or any component thereof, may be substantially a one-piece design and/or substantially formed as an integral or unitary structure.

Closure 5, closure 100, closure 200, closure 300, and/or container 500, or any component thereof, may vary in size, shape, geometry, material, and/or process or processes used to make them. For a first example, in some embodiments, closure 5, 100, 200, 300 may be substantially injection molded polypropylene. Closure 5 may be injection molded with the tamper band and/or segments extended downwardly, for example. Separation areas and tab aperture 34 may be injection molded into closure 5 while closure 5 is being injection molded. In a second example, there may be substantially no physical separation between tamper band 130 and the rest of the skirt 120 (e.g., one or more scores not yet present). A secondary or subsequent process may be employed, such as a cutting or slitting operation, to cut one or more of the separation areas and tab aperture 134 into closure 100, skirt 120, and/or tamper band 130. For example, one or more vertical knives may be used to cut the vertical scores and/or tab aperture 34, and/or one or more horizontal knives may be used to cut the horizontal scores into the closure. At any time during the cutting operation(s), or any time before or after, the segments may be inverted and/or folded or pushed up into the interior of the closure and/or the tamper band.

In a third example, closure 100 may be substantially compression molded HDPE. The closure may be compression molded with the tamper band and/or segments extended downwardly and/or there may be substantially no physical separation between the tamper band and the rest of the skirt (e.g., one or more scores not yet present). A secondary or subsequent process may be employed, such as a cutting or slitting operation, to cut one or more of the scores into the closure, skirt, and/or tamper band. For example, one or more vertical knives may be used to cut the vertical scores and/or one or more horizontal knives may be used to cut the horizontal scores into the closure. At any time during the cutting operation(s), or any time before or after, the segments may be inverted and/or folded or pushed up into the interior of the closure and/or the tamper band.

In a fourth example, closure 100 may be injection molded HDPE with the tamper band and/or segments extended downwardly and/or there may be substantially no physical separation between the tamper band and the rest of the skirt (e.g., one or more scores not yet present). A secondary or subsequent process may be employed, such as a cutting or slitting operation, to cut one or more of the scores into the closure, skirt, and/or tamper band. For example, one or more vertical knives may be used to cut the vertical scores and/or one or more horizontal knives may be used to cut the horizontal scores into the closure. At any time during the cutting operation(s), or any time before or after, the segments may be inverted and/or folded or pushed up into the interior of the closure and/or the tamper band.

In a fifth example, closure 100 may be substantially compression molded PP. The closure may be compression molded with the tamper band and/or segments extended downwardly and/or there may be substantially no physical separation between the tamper band and the rest of the skirt (e.g., one or more scores not yet present). A secondary or subsequent process may be employed, such as a cutting or slitting operation, to cut one or more of the scores into the closure, skirt, and/or tamper band. For example, one or more vertical knives may be used to cut the vertical scores and/or one or more horizontal knives may be used to cut the horizontal scores into the closure. At any time during the cutting operation(s), or any time before or after, the segments may be inverted and/or folded or pushed up into the interior of the closure and/or the tamper band. It is understood that in these or other examples, any or all scores, cuts, slits, gaps, slots, and/or areas of weakened material such as a thinned web may be formed during an injection molding and/or compression molding process instead of or in addition to any separate and/or secondary cutting or slitting operations.

In a sixth example, closure 200 may be injection molded PP or HDPE with tab aperture 234 injection molded contemporaneously into closure 5. A secondary or subsequent process may be employed, such as a cutting or slitting operation, to cut one or more of the scores into the closure, skirt, and/or tamper band. For example, one or more vertical knives may be used to cut the vertical scores and/or one or more horizontal knives may be used to cut the horizontal scores into the closure. At any time during the cutting operation(s), or any time before or after, the segments may be inverted and/or folded or pushed up into the interior of the closure and/or the tamper band. It is understood that in these or other examples, any or all scores, cuts, slits, gaps, slots, and/or areas of weakened material such as a thinned web may be formed during an injection molding and/or compression molding process instead of or in addition to any separate and/or secondary cutting or slitting operations.

It is understood that, while some directional terms are used herein, such as top, bottom, upper, lower, inward, outward, upward, downward, etc., these terms are not intended to be limiting but rather to relate to one or more exemplary orientations, positions, and/or configurations of container 300 and/or closure 5, 100, 200 and/or any component thereof. It is understood container 300 and/or closure 5, 100, 200 and/or any component or portion thereof may be inverted or re-oriented to face or point a different direction without departing from the nature of container 300 and/or closure 5, 100, 200 disclosed herein.

These and other modifications and variations may be practiced by those of ordinary skill in the art without departing from the spirit and scope, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the scope of that which is described in the claims. Therefore, the spirit and scope of the appended claims should not be limited to the exemplary description of the versions contained herein.

That which is claimed:

1. A closure for a container, comprising:

a cover and a skirt depending from the cover;

a tamper band, wherein the skirt is disposed between the cover and the tamper band;

a first cross separation area extending around a portion of the skirt;

a first transverse separation area that extends transverse to the first cross separation area to a bottom of the tamper band;

a second transverse separation area that extends transverse to the first cross separation area to a bottom of the tamper band;

wherein the first transverse separation area and the second transverse separation area at least partially define a tab;

a first hinge disposed between the first cross separation area and the first transverse separation area;

a second hinge disposed between the first cross separation area and the second transverse separation area;

wherein the cover is configured to rotate about a hinge axis that extends through the first hinge and the second hinge between a closed position in which the cover blocks access to the container and an open position in which the cover allows discharge of contents from the container;

wherein the tab is configured to engage the container when the closure is in the open position to retain the closure in the open position;

wherein the first hinge and second hinge allow movement of the closure between the closed position and the open position and retain the skirt to the tamper band;

wherein the tamper band includes one or more segments connected by a segment bridge, the segment bridge extending directly behind the tab and aligned with the tab in a radial direction perpendicular to a central axis of the closure when the cover is in the closed position; and a tab aperture disposed behind the tab opposite a tab outer surface, the tab aperture separating the tab from the segment bridge.

2. The closure of claim 1, further comprising a tab protrusion on the tab outer surface and extending radially outwardly from the tab.

3. The closure of claim 2, wherein the tab protrusion includes a first extension having an angled surface configured to engage a portion of the container to lock the closure in the open position relative to the container.

4. The closure of claim 3, wherein the tab protrusion further comprises a second extension that extends transverse to the first extension.

5. The closure of claim 1, further comprising a second cross separation area extending circumferentially around a portion of the tamper band disposed between the first cross separation area and a bottom edge of the tamper band.

6. The closure of claim 5, further comprising a first strap between the first cross separation area and the second cross separation area and on a first side of the tab.

7. The closure of claim 6, further comprising a second strap between the first cross separation area and the second cross separation area and on a second side of the tab opposite the first side of the tab.

8. The closure of claim 1, wherein at least one of the first transverse separation area and the second transverse separation area extend through a bottom edge of the tamper band.

9. The closure of claim 8, wherein the tab extends to a tab bottom edge that is circumferentially aligned with the bottom edge of the tamper band.

10. A closure for a container, comprising:

a cover and a skirt depending from the cover;

a tamper band, wherein the skirt is disposed between the cover and the tamper band;

a first cross separation area extending around at least half of the skirt and separating the skirt from the tamper band;

a first transverse separation area that extends transverse to the first cross separation area toward a bottom of the tamper band;

a second transverse separation area that extends transverse to the first cross separation area toward a bottom of the tamper band;

wherein the first transverse separation area and the second transverse separation area at least partially define a tab;

a first hinge disposed between the first cross separation area and the first transverse separation area;

a second hinge disposed between the first cross separation area and the second transverse separation area;

wherein the cover is configured to rotate about a hinge axis that extends through the first hinge and the second hinge between a closed position in which the cover blocks access to the container and an open position in which the cover allows discharge of contents from the container;

wherein the tab is configured to engage a container bead of the container when the closure is in the open position to retain the closure in the open position;

wherein the first hinge and second hinge allow movement of the closure between the closed position and the open position and retain the skirt to the tamper band;

wherein the tamper band includes one or more segments on a radially inward side of the tamper band, the one or more segments are connected by a segment bridge on a radially inward side of the tab, and the one or more segments cooperate with the segment bridge to form a continuous hoop of material; and a tab aperture disposed behind the tab opposite a tab outer surface, the tab aperture separating the tab from the segment bridge so the tab may invert when the closure is moved between the open position and the closed position, wherein the segment bridge is located directly radially behind the tab when the cover is in the closed position relative to a central axis of the closure.

11. The closure of claim 10, further comprising a tab protrusion on the tab outer surface and extending radially outwardly from the tab.

12. The closure of claim 10, further comprising a second cross separation area extending circumferentially around a portion of the tamper band disposed between the first cross separation area and a bottom edge of the tamper band.

13. The closure of claim 10, wherein at least one of the first transverse separation area and the second transverse separation area extend through a bottom edge of the tamper band.

14. The closure of claim 13, wherein the tab extends to a tab bottom edge that is circumferentially aligned with the bottom edge of the tamper band.

15. A method of providing a retainable, tamper evident closure, the method comprising the steps of:

forming a closure having a cover, a skirt, and a tamper band, the skirt disposed between the cover and the tamper band;

wherein the tamper band includes one or more segments and a segment bridge connecting the one or more segments;

forming a first transverse separation area and a second transverse separation area in the tamper band that extend in a first axial direction to at least partially define a tab;

forming a first cross separation area that extends transverse to the first transverse separation area and the second transverse separation area and at least partially separating the skirt and the tamper band; and forming a tab aperture below the segment bridge and that separates the tab from the segment bridge, the segment bridge provided radially inward of the tab and aligned with the tab in a radial direction relative to a central axis of the closure.

16. The method of claim 15, further comprising a step of forming a second cross separation area spaced apart from the first cross separation area in the first axial direction.

17. The method claim 15, wherein the step of forming the closure includes injection molding the closure, and wherein the step of forming the tab aperture occurs simultaneously with the injection molding of the closure.

18. The method of claim 17, wherein the step of forming the first transverse separation area and the second transverse separation area includes injection molding in the first transverse separation area and the second transverse separation area simultaneously with injection molding the closure.

19. The method of claim 18, wherein the step of forming the first cross separation area includes injection molding in the first cross separation area simultaneously with injection molding the closure.

20. The method of claim 15, further comprising a step of cutting or slitting at least one of the first transverse separation area, the second transverse separation area, the first cross separation area, and the tab aperture into the tamper band after forming the closure.

* * * * *